(12) United States Patent
Rho et al.

(10) Patent No.: US 12,248,214 B2
(45) Date of Patent: Mar. 11, 2025

(54) COLOR FILTER

(71) Applicant: POSTECH RESEARCH AND BUSINESS DEVELOPMENT FOUNDATION, Pohang-si (KR)

(72) Inventors: Junsuk Rho, Pohang-si (KR); Young-Ki Kim, Pohang-si (KR); Joohoon Kim, Pohang-si (KR); Won-Sik Kim, Pohang-si (KR); Trevon Badloe, Pohang-si (KR)

(73) Assignee: Postech Research and Business Development Foundation, Pohang-si (KR)

( * ) Notice: Subject to any disclaimer, the term of this patent is extended or adjusted under 35 U.S.C. 154(b) by 3 days.

(21) Appl. No.: 18/304,726

(22) Filed: Apr. 21, 2023

(65) Prior Publication Data
US 2023/0359080 A1 Nov. 9, 2023

(30) Foreign Application Priority Data
May 3, 2022 (KR) .................. 10-2022-0054499

(51) Int. Cl.
G02F 1/1335 (2006.01)
G02F 1/1337 (2006.01)
G02F 1/1343 (2006.01)

(52) U.S. Cl.
CPC .. *G02F 1/133514* (2013.01); *G02F 1/133528* (2013.01); *G02F 1/133707* (2013.01); *G02F 1/134363* (2013.01)

(58) Field of Classification Search
None
See application file for complete search history.

(56) References Cited

U.S. PATENT DOCUMENTS

| 11,009,634 B2 | 5/2021 | Park et al. |
| 11,048,027 B2 | 6/2021 | Rho et al. |
| 2003/0133064 A1* | 7/2003 | Kondo ............ G02F 1/133788 349/123 |

(Continued)

FOREIGN PATENT DOCUMENTS

| KR | 2009/0118310 A | 11/2009 |
| KR | 20140069879 A * | 6/2014 |

(Continued)

OTHER PUBLICATIONS

Trevon Badloe et al. 'Liquid crystal-powered Mie resonators for electrically tunable photorealistic color gradients and dark blacks' *Light: Science and Applications*, 2022.

(Continued)

*Primary Examiner* — Shan Liu
(74) *Attorney, Agent, or Firm* — Harness, Dickey & Pierce, P.L.C.

(57) ABSTRACT

Provided is a color filter. The color filter includes a nano structure layer including a base substrate and a plurality of nano structures which are disposed to be spaced apart from each other on the base substrate and each of which has an elliptical shape on a plane, and a polarization control layer disposed on the nano structure layer and including liquid crystal molecules of which an alignment direction on a plane parallel to the base substrate is controlled by an electric field to realize excellent color reproducibility.

20 Claims, 17 Drawing Sheets

(56) References Cited

U.S. PATENT DOCUMENTS

| | | | |
|---|---|---|---|
| 2009/0284696 A1 | 11/2009 | Cheong et al. | |
| 2011/0102715 A1* | 5/2011 | Park | G02F 1/133514 |
| | | | 438/27 |
| 2018/0083070 A1* | 3/2018 | Zhang | H10K 59/12 |
| 2019/0146130 A1 | 5/2019 | Kwak et al. | |
| 2020/0264355 A1* | 8/2020 | Shin | G02F 1/1335 |
| 2021/0396659 A1 | 12/2021 | Jang et al. | |

FOREIGN PATENT DOCUMENTS

| | | | |
|---|---|---|---|
| KR | 101557800 B1 | | 10/2015 |
| KR | 20170080307 A | * | 7/2017 |
| KR | 101891912 B1 | | 9/2018 |
| KR | 2019-0055297 A | | 5/2019 |
| KR | 101994388 B1 | | 6/2019 |
| KR | 2021/0156191 A | | 12/2021 |
| KR | 2022/0136763 A | | 10/2022 |

OTHER PUBLICATIONS

Inki Kim et al., 'Structural color switching with a doped indium-gallium-zinc-oxide semiconductor' *Photonics Research*, vol. 8, No. 9, Sep. 2020.

Chunghwan Jung et al., 'Near-zero reflection of all-dielectric structural coloration enabling polarization-sensitive optical encryption with enhanced switchability' *Nanophotonics*, vol. 10, No. 2, Nov. 2020, pp. 919-926.

Jaehyuck Jang et al., 'Self-Powered Humidity Sensor Using Chitosan-Based Plasmonic Metal-Hydrogel-Metal Filters' *Advanced Optical Materials*, vol. 8, 2020.

Jaehyuck Jang et al., 'Spectral Modulation through the Hybridization of Mie-Scatterers and Quasi-Guided Mode Resonances: Realizing Full and Gradients of Structural Color' *ACS Nano*, vol. 14, 2020, pp. 15317-15326.

* cited by examiner

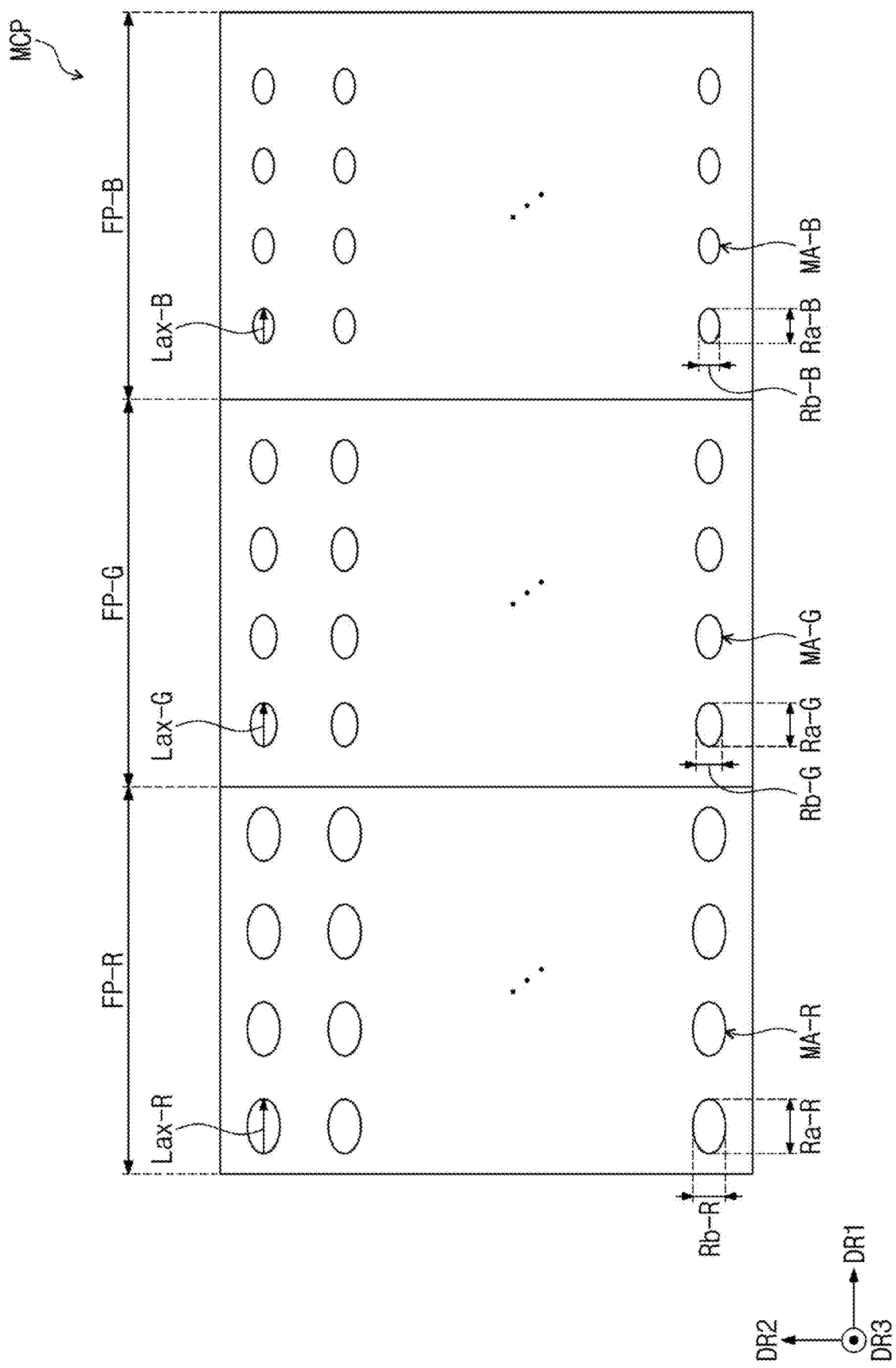

FIG. 9D
FIG. 9E
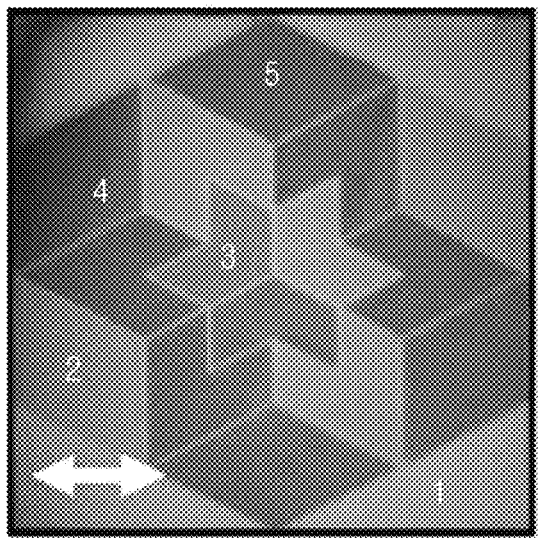
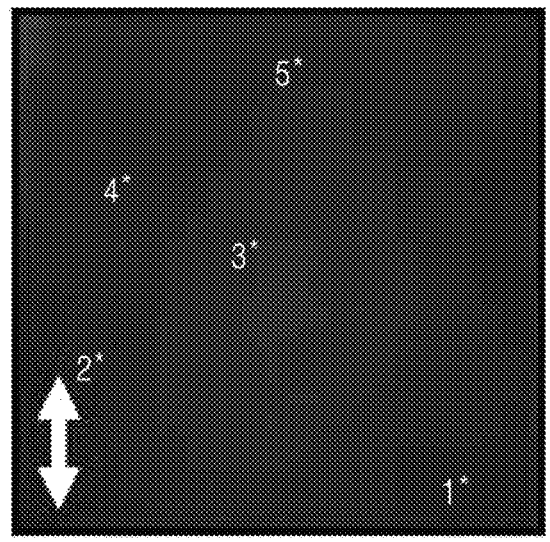

FIG. 14A  FIG. 14B  FIG. 14C
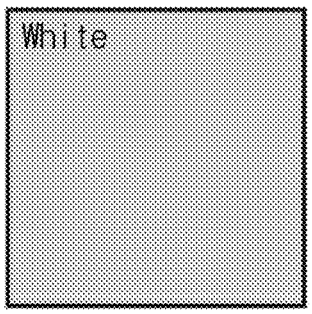
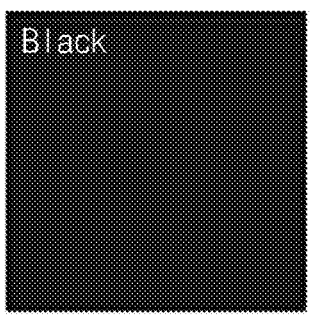
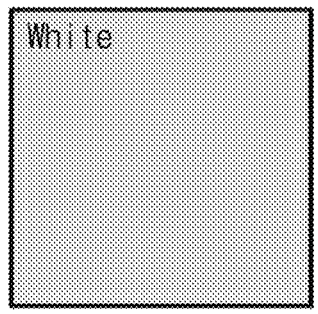
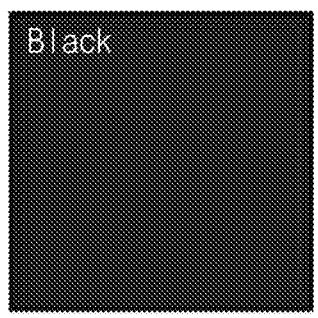
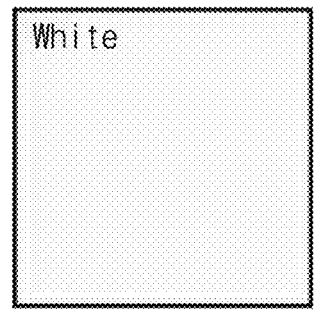
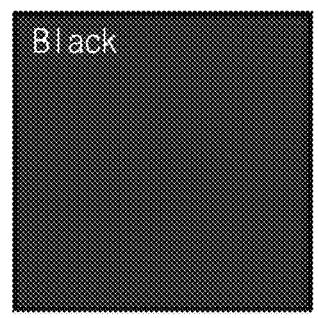
FIG. 14D
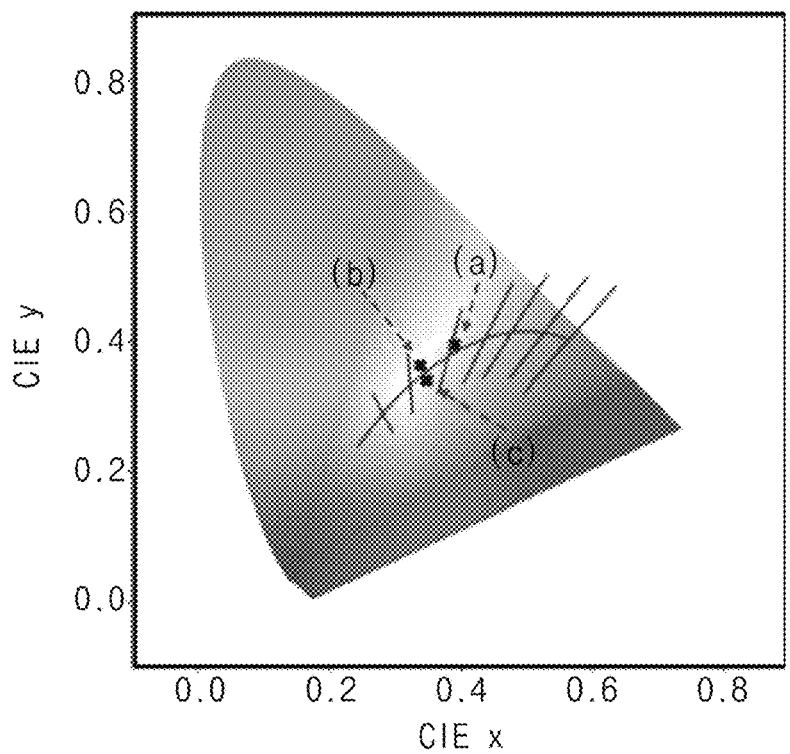

COLOR FILTER

CROSS-REFERENCE TO RELATED APPLICATIONS

This U.S. non-provisional patent application claims priority under 35 U.S.C. § 119 of Korean Patent Application No. 10-2022-0054499, filed on May 3, 2022, the entire contents of which are hereby incorporated by reference.

BACKGROUND

The present disclosure herein relates to a color filter, and more particularly, to a reflective color filter including nano structures.

Instead of a color filter manufactured using a pigment or dye, recently, a color filter having a structural color, which realizes a desired color by controlling reflection and absorption of incident light using a nano structure having a size less than a wavelength of light is being developed. In addition, a reflective color filter that realizes various colors by reflecting incident light using a meta atom having a meta surface is also being developed.

However, in the case of the color filter using the nano structure according to the related art, there is a limit in realizing excellent display quality such as natural colors or photos due to a limited shape of a nano structure and a limitation, in which it is not easy to control light provided to the nano structure.

SUMMARY

The present disclosure provides a color filter capable of realizing high color reproducibility and excellent contrast expression by providing light, of which light quantity and a polarization direction are controllable, to a nano structure capable of realizing a structural color.

An embodiment of the inventive concept provides a color filter including: a nano structure layer including a base substrate and a plurality of nano structures which are disposed to be spaced apart from each other on the base substrate and each of which has an elliptical shape on a plane; and a polarization control layer disposed on the nano structure layer and including liquid crystal molecules of which an alignment direction on a plane parallel to the base substrate is controlled by an electric field.

In an embodiment, the nano structures may include a dielectric including amorphous silicon.

In an embodiment, in each of the nano structures, a first diameter in a first direction and a second diameter in a second direction perpendicular to the first direction may be different from each other, wherein a ratio of the first diameter to the second diameter may be 2:1 to 3.5:1.

In an embodiment, the liquid crystal molecules may include nematic liquid crystal molecules, and the alignment direction may be an alignment direction of each of long axes of the liquid crystal molecules, and the alignment direction may be variably changed between the first direction and the second direction.

In an embodiment, as the alignment direction is changed from the first direction to the second direction, reflectance of light reflected and emitted from the nano structures may decrease.

In an embodiment, when the alignment direction is parallel to the first direction, the polarization control layer may have a transmission axis parallel to the first direction, and the reflectance of the light reflected from the nano structures may be maximized, and when the alignment direction is parallel to the second direction, the polarization control layer may have a transmission axis parallel to the second direction, and the reflectance of the light reflected and emitted from the nano structures may be minimized.

In an embodiment, the nano structures may include: a plurality of first nano structures that emit light having a first wavelength; a plurality of second nano structures that emit light having a second wavelength, in which a wavelength is less than the first wavelength; and a plurality of third nano structures that emit light having a third wavelength, in which a wavelength is less than the second wavelength.

In an embodiment, on the base substrate, the first nano structures may be arranged to be spaced a first arrangement interval from each other, the second nano structures may be arranged to be spaced a second arrangement interval from each other, and the third nano structures may be arranged to be spaced a third arrangement interval from each other, the first arrangement interval may be less than the first wavelength, the second arrangement interval may be less than the second wavelength, and the third arrangement interval may be less than the third wavelength, and the first arrangement interval to the third arrangement interval may be arrangement intervals in a long axis direction of the first to third nano structures, respectively.

In an embodiment, a long axis diameter of each of the first nano structures in one direction may be greater than that of each of the second nano structures in the one direction, and the long axis diameter of each of the second nano structures may be greater than that of each of the third nano structures in the one direction.

In an embodiment, the arrangement direction of at least one nano structures of the first nano structures to the third nano structures may be different from that of the other nano structures.

In an embodiment, the long axis diameter of at least one nano structure among the nano structures may be different from that of each of other nano structures.

In an embodiment, the polarization control layer may include: a liquid crystal layer including the liquid crystal molecules; a first substrate disposed under the liquid crystal layer; a second substrate disposed over the liquid crystal layer; and a plurality of switching electrodes disposed above the first substrate and spaced apart from each other.

In an embodiment of the inventive concept, a color filter, which is divided into a first filter area, a second filter area, and a third filter area, which provide light having wavelength different from each other, the color filter includes: a nano structure layer including a first filter part disposed to correspond to the first filter area and including a plurality of first nano structures, a second filter part disposed to correspond to the second filter area and including a plurality of second nano structures, and a third filter part disposed to correspond to the third filter area and including a plurality of third nano structures; and a polarization control layer, which is disposed on the nano structures and includes a first substrate, a second substrate facing the first substrate, a plurality of switching electrodes disposed to be spaced apart from each other on a top surface of the first substrate, and a liquid crystal layer liquid crystal molecules of which an alignment direction is controlled by an electric field between the adjacent switching electrodes disposed between the first substrate and the second substrate. In an embodiment, each of the first to third nano structures may have an elliptical shape on a plane, the first nano structures may be arranged to be spaced a first arrangement interval from each other, the second nano structures may be arranged to be spaced a second arrangement interval, which is less than the first arrangement interval, from each other, and the third nano structures may be arranged to be spaced a third arrangement interval, which is less than the second arrangement interval, from each other, and the first arrangement interval to the third arrangement interval may be arrangement intervals in a long axis diameter direction of the first to third nano structures, respectively.

In an embodiment, the polarization control layer may include: a first light control part corresponding to the first filter area; a second light control part corresponding to the second filter area; and a third light control part corresponding to the third filter area, wherein the alignment direction of the liquid crystal molecules may be controlled independently in the first light control part to the third light control part.

In an embodiment, the liquid crystal molecules may include nematic liquid crystal molecules, and the alignment direction is an alignment direction of a long axis of each of the liquid crystal molecules.

In an embodiment, the first nano structures may emit light having a first wavelength, the second nano structures may emit light having a second wavelength, in which a wavelength is less than the first wavelength, and the third nano structures may emit light having a third wavelength, in which a wavelength is less than the second wavelength.

In an embodiment, the first arrangement interval may be less than the first wavelength, the second arrangement interval may be less than the second wavelength, and the third arrangement interval may be less than the third wavelength.

In an embodiment, a first long axis diameter of each of the first nano structures, a second long axis diameter of each of the second nano structures, and a third long axis diameter of each of the third nano structures may be different from each other.

In an embodiment, the first nano structures may be aligned in a first arrangement direction, the second nano structures may be aligned in a second arrangement direction, and the third nano structures may be aligned in a third arrangement direction, at least one of the first arrangement direction, the second arrangement direction, or the third arrangement direction may be different from the others; and the first to third arrangement directions may be directions of the long axis diameters of the first to third nano structures, respectively.

In an embodiment, the alignment direction of the liquid crystal molecules in each of the first light control part, the second light control part, and the third light control part may be independently controlled between a first direction parallel to each of the first arrangement direction, the second arrangement direction, and the third arrangement direction and a second direction perpendicular to the first direction.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5B is a plan view of the nano structure layer according to an embodiment of the inventive concept;

FIG. 9D and FIG. 9E are views illustrating an example of color expression depending on types of the nano structure according to an embodiment of the inventive concept;

FIGS. 14A to 14C are views illustrating an image in which white and black are expressed in color filters according to an embodiment of the inventive concept;

FIG. 14D is a view illustrating a variation in color coordinate of white in color filters according to an embodiment of the inventive concept;

DETAILED DESCRIPTION

Figure 1:
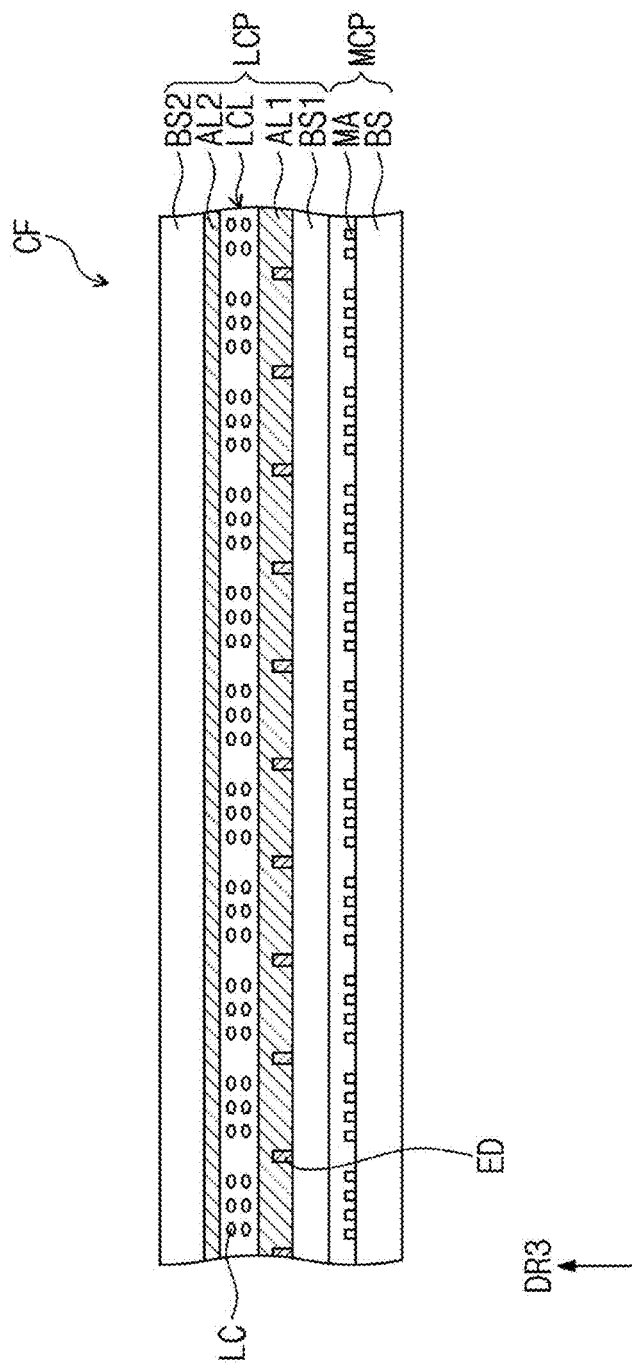
FIG. 1 is a cross-sectional view of a color filter according to an embodiment of the inventive concept.

Since the present invention may have diverse modified embodiments, specific embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In this specification, it will also be understood that when one component (or area, layer, portion) is referred to as being 'on', 'connected to', or 'coupled to' another component, it can be directly disposed/connected/coupled on/to the one component, or an intervening third component may also be present.

In this specification, "directly disposed" may mean that there is no layer, film, area, plate, or the like between a portion of the layer, the layer, the area, the plate, or the like and the other portion. For example, "directly disposed" may mean being disposed without using an additional member such and an adhesion member between two layers or two members.

Like reference numerals refer to like elements throughout. Also, in the figures, the thickness, ratio, and dimensions of components are exaggerated for clarity of illustration. The term "and/or" includes any and all combinations of one or more of the associated elements.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims. The terms of a singular form may include plural forms unless referred to the contrary.

Also, "under", "below", "above', "upper", and the like are used for explaining relation association of the elements illustrated in the drawings. The terms may be a relative concept and described based on directions expressed in the drawings. In this specification, the term "disposed on" may refer to a case in which it is disposed on a lower portion as well as an upper portion of any one member.

Unless otherwise defined, all terms (including technical and scientific terms) used herein have the same meaning as commonly understood by a person of ordinary skill in the art to which the present invention belongs. In addition, terms such as terms defined in commonly used dictionaries should be interpreted as having a meaning consistent with the meaning in the context of the related technology, and unless explicitly defined here, they are interpreted as too ideal or too formal sense.

The meaning of 'include' or 'comprise' specifies a property, a fixed number, a process, an operation, an element, a component or a combination thereof, but does not exclude other properties, fixed numbers, processes, operations, elements, components or combinations thereof.

Hereinafter, a color filter according to an embodiment of the inventive concept will be described with reference to the accompanying drawings.

Figure 2:
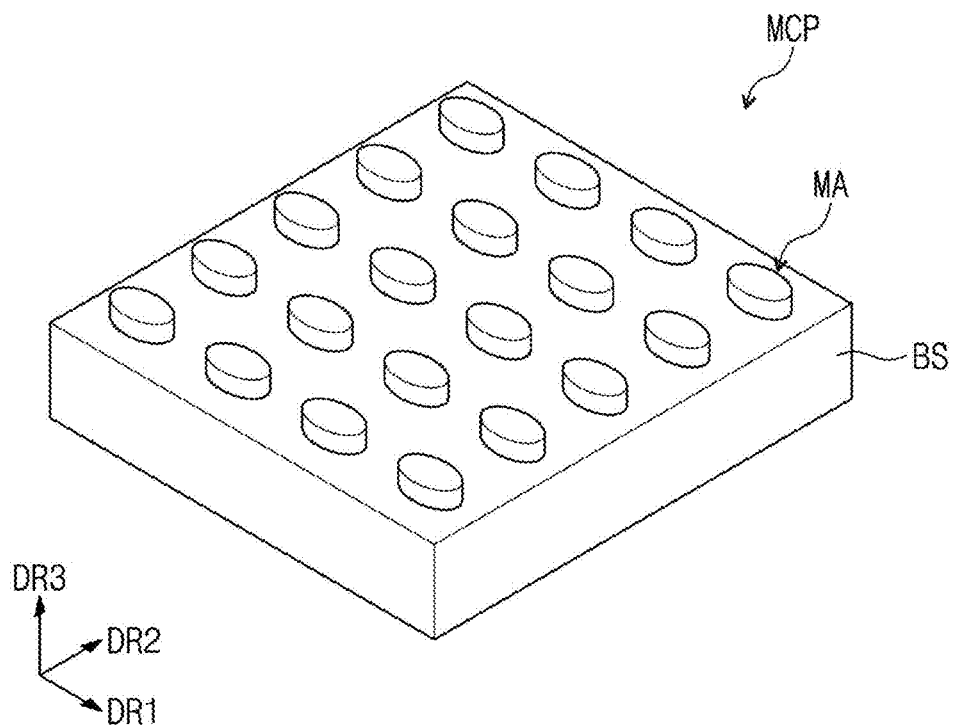
FIG. 2 is a perspective view of a nano structure layer according to an embodiment of the inventive concept.
Figure 3:
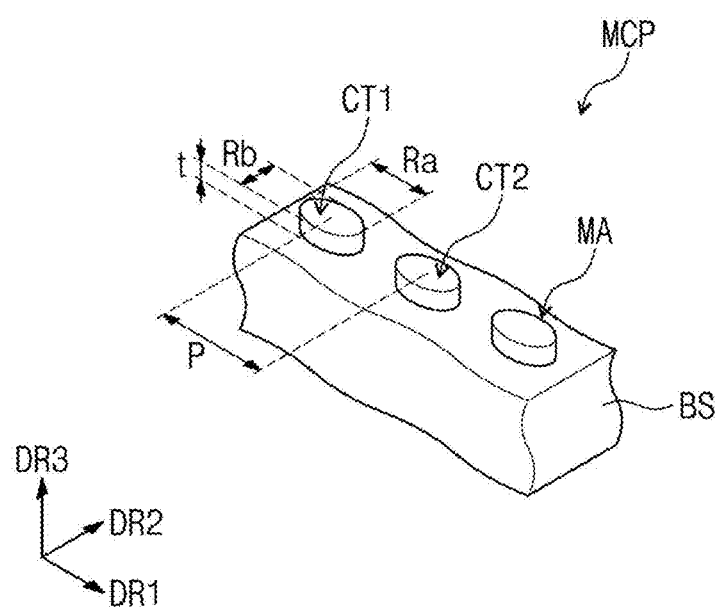
FIG. 3 is a perspective view illustrating a portion of the nano structure layer according to an embodiment of the inventive concept.

FIG. 1 is a cross-sectional view of a color filter according to an embodiment of the inventive concept. FIG. 2 is a perspective view of a nano structure layer according to an embodiment of the inventive concept. FIG. 3 is a perspective view illustrating a portion of the nano structure layer according to an embodiment of the inventive concept;

Referring to FIG. 1, a color filter CF according to an embodiment may include a nano structure layer MCP and a polarization control layer LCP disposed on the nano structure layer MCP. The polarization control layer LCP may be disposed on the nano structure layer MCP to control an amount and polarization direction of external light provided on the polarization control layer LCP, thereby providing the light to the nano structure layer MCP. In addition, light reflected and provided by the nano structure layer MCP may be emitted to the outside by passing through the polarization control layer LCP. The color filter CF according to an embodiment may be a reflective color filter including the nano structure layer MCP that reflects and provides the provided external light as light in a specific wavelength region.

The nano structure layer MCP may include a base substrate BS and a plurality of nano structures MA disposed on the base substrate BS. Each of the nano structures MA may have an elliptical shape on a plane. That is, each of the nano structures MA may have an elliptical shape in which a diameter Ra in a long axis direction and a diameter Rb in a short axis direction are different from each other on the plane defined by a first directional axis DR1 and a second directional axis DR2. The nano structures MA may have an elliptical pillar shape disposed on the base substrate BS.

The first to third directional axes DR1 to DR3 are illustrated in FIG. 1 and following drawings, and directions indicated by the first to third directional axes DR1, DR2, and DR3, which are described in this specification, may be relative concepts and thus may be changed into different directions. Also, directions indicated by the first to third direction axes DR1, DR2, and DR3 may be described as first to fourth directions, and the same reference numerals may be used.

The polarization control layer LCP may be disposed above the nano structures MA. The polarization control layer LCP may be directly disposed on the nano structure layer MCP without using a separate adhesive member. In an embodiment, air may be filled between the nano structures MA of the nano structure layer MCP and the polarization control layer LCP. However, the embodiment is not limited thereto, and an optical layer may be added between the nano structures MA and the polarization control layer LCP to improve extraction efficiency of light, which is reflected from the nano structure layer MCP and then is emitted upward.

The polarization control layer LCP may be a liquid crystal panel including a liquid crystal layer LCL. The liquid crystal layer LCL may include liquid crystal molecules LC of which an alignment direction is controlled on a plane. The polarization control layer LCP may include a first substrate BS1, a second substrate BS2 facing the first substrate BS1, a plurality of switching electrodes ED spaced apart from each other on a top surface of the first substrate BS1, and a liquid crystal layer LCL disposed between the first substrate BS1 and the second substrate BS2. The alignment direction of the liquid crystal molecules LC contained in the liquid crystal layer LCL may be controlled by an electric field between the adjacent switching electrodes ED.

Each of the first substrate BS1 and the second substrate BS2 may be a glass substrate or a plastic substrate including a polymer material. However, the embodiment is not limited thereto, and the first substrate BS1 and the second substrate BS2 may be used without limitation as long as the first substrate BS1 and the second substrate BS2 are insulating substrates having high light transmittance.

The polarization control layer LCP may further include at least one alignment layer AL1 and AL2. The first alignment layer AL1 may be disposed on a top surface of the first substrate BS1, and the second alignment layer AL2 may be disposed on a bottom surface of the second substrate BS2. For example, each of the alignment layers AL1 and AL2 may include polyimide. In order to provide an initial alignment direction of the liquid crystal molecules LC, the surfaces of the first alignment layer AL1 and the second alignment layer AL2 may be processed by a physical or chemical method. For example, the surfaces of the first alignment layer AL1 and the second alignment layer AL2 may be processed by rubbing, ultraviolet rays, or ion beams. In an embodiment, the alignment layers AL1 and AL2 may be omitted.

FIGS. 2 and 3 illustrate a portion of the nano structure layer MCP according to an embodiment. The nano structure layer MCP may include a base substrate BS and a plurality of nano structures MA disposed on the base substrate BS and serving as dielectrics. Each of the nano structures MA may have a size of several tens to several hundred nanometer scales such as width and height, which are less than a wavelength of light provided to the nano structures MA. Light having a specific wavelength in the light provided to the nano structures MA may be reflected and emitted according to sizes and arrangement intervals of the nano structures MA. Each of the nano structures MA may be made of a meta material having a meta surface.

Each of the nano structures MA may be a dielectric including amorphous silicon. Each of the nano structures MA may have a large refractive index and a small extinction coefficient in a visible light region. Each of the nano structures MA may have a refractive index of about 2.0 or more in the visible light region. Each of the nano structures MA may include silicon hydride (a-Si:H) or the like.

The base substrate BS may reflect an transmit light provided from the outside to provide the light to the nano structures MA. The base substrate BS may include $SiO_2$. In an embodiment, the base substrate BS may be a glass substrate. The base substrate BS may have a refractive index lower than that of each of the nano structures MA. In addition, the base substrate BS may have a refractive index greater than that of air on one surface to which the base substrate BS is exposed.

In the color filter according to an embodiment, the nano structure layer MCP may include the plurality of nano structures MA, each of which has a size less than a wavelength of the incident light and has an elliptical shape on the plane and which are spaced a predetermined distance from each other so that light provided to the base substrate BS is effectively reflected by quasi Guided-mode resonance (qGMR) and thus is emitted to the outside.

In the nano structure layer MCP, the diameter, height, and arrangement interval of the nano structures MA may be optimized to adjust a wavelength and shade of the provided light reflected from the nano structures MA. In an embodiment, in the nano structure MA, a first diameter Ra in the first direction DR1, which is a diameter in a long axis direction, and a second diameter Rb in the second direction DR2, which is a diameter in a short axis direction, may be different from each other. Also, a ratio of the first diameter Ra to the second diameter Rb may be 2:1 to 3.5:1. As the first diameter Ra in the first direction DR1 in the nano structure MA decreases, a reflection wavelength of the light emitted from the nano structure MA may be shortened. For example, in an embodiment, the first diameter Ra of the nano structure MA may be about 150 nm to about 400 nm, and the second diameter Rb may be about 60 nm to about 120 nm. However, the embodiment is not limited thereto, and the first diameter Ra and the second diameter Rb may be adjusted according to a required reflection wavelength.

Also, in an embodiment, the wavelength of the provided light reflected from the nano structures MA may be changed according to the arrangement interval P of the nano structures MA. In the nano structures MA, the reflection wavelength of the light emitted from the nano structures MA may be shortened as the arrangement interval P decreases. In this specification, the arrangement interval P of the nano structures MA may be a distance in a direction parallel to the long axis direction of the nano structures MA, i.e., a distance between a first center CT1 and a second center CT2 of the adjacent nano structures MA. For example, in an embodiment, the arrangement interval P of the nano structures MA may be about 300 nm or more and about 450 nm or less. However, the embodiment is not limited thereto, and the arrangement interval P may be adjusted according to the required reflection wavelength.

In an embodiment, a thickness t of the nano structure MA may be about 100 nm or more and about 200 nm or less. For example, the thickness t of the nano structure MA may be about 120 nm to about 170 nm or less. However, the embodiment of the inventive concept is not limited thereto.

Figure 4A:
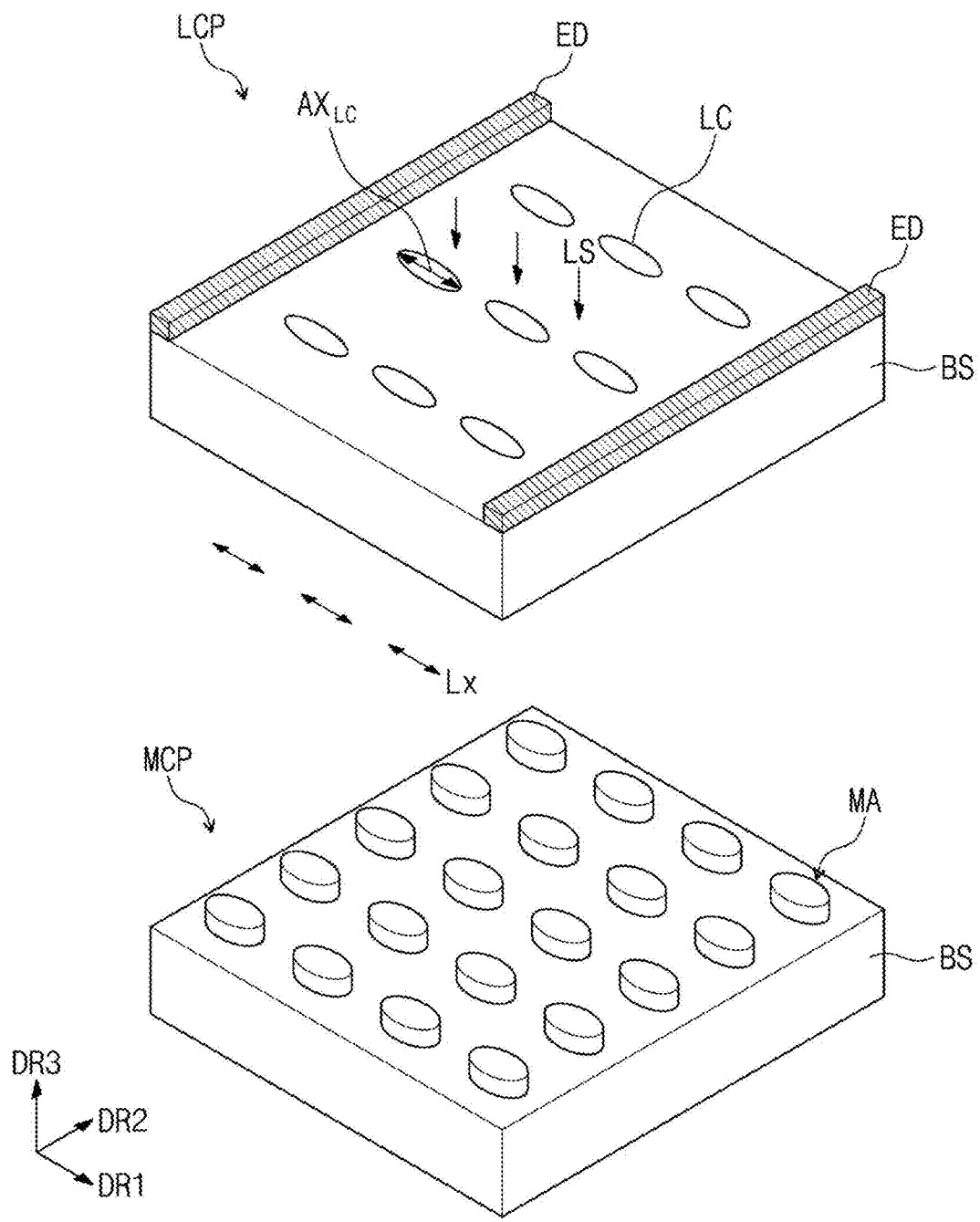
FIG. 4A is a view illustrating an example of an operation of the color filter according to an embodiment of the inventive concept.
Figure 4B:
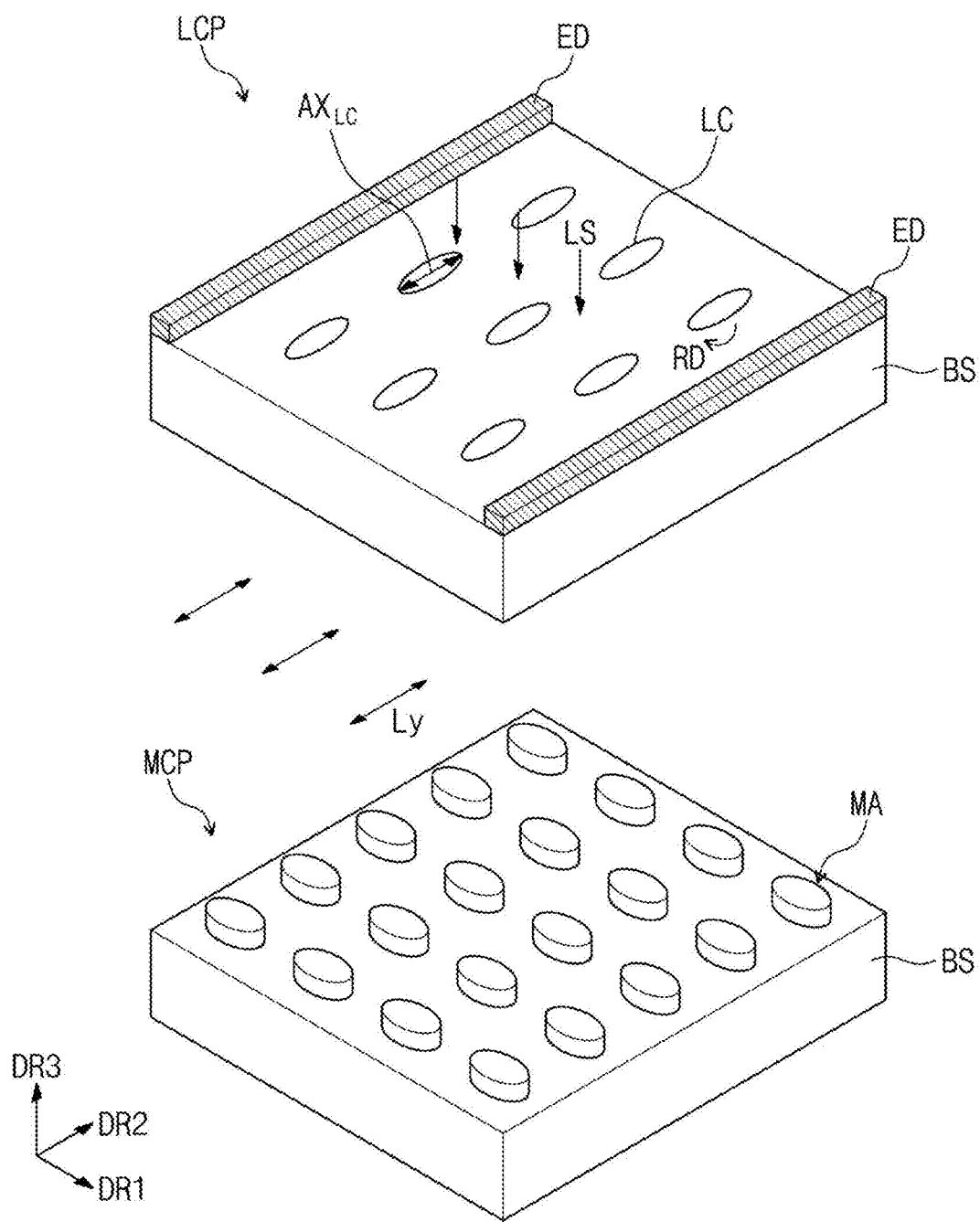
FIG. 4B is a view illustrating an example of an operation of the color filter according to an embodiment of the inventive concept.

FIGS. 4A and 4B are views illustrating an example of an operation of the color filter according to an embodiment of the inventive concept.

Referring to FIGS. 4A and 4B, the liquid crystal molecules LC contained in the polarization control layer LCP may be disposed between the adjacent switching electrodes ED so as to be changed in alignment direction. The alignment direction of the liquid crystal molecules LC may be an extension direction of a long axis AXLC of the liquid crystal molecules. In an embodiment, the liquid crystal molecules LC may be nematic liquid crystals, and the alignment direction of the liquid crystal molecules LC may be controlled according to an electric field provided by the adjacent switching electrodes ED. That is, in an embodiment, the liquid crystal molecules LC may operate in an in-plane switching (IPS) mode in which the alignment direction is changed between the adjacent switching electrodes ED on the plane defined by the first directional axis DR1 and the second directional axis DR2.

In the embodiment illustrated in FIGS. 4A and 4B, each of the switching electrodes ED may have a stripe shape extending in one direction. In FIGS. 4A and 4B, each of the switching electrodes ED is illustrated as extending in the direction parallel to the second directional axis DR2, but the embodiment is not limited thereto. For example, the alignment direction of the liquid crystal molecules LC may be controlled to change the extension direction and shape of the switching electrodes ED within a range in which the polarization direction is effectively adjusted in the polarization control layer LCP.

FIG. 4A illustrates a case in which the alignment direction of the liquid crystal molecules LC is parallel to the first direction DR1. In this case, the external light LS provided from an upper side of the polarization control layer LCP may pass through the polarization control layer LCP to provide first polarized light Lx polarized in the direction parallel to the first direction DR1 to the nano structure layer MCP. That is, when the liquid crystal molecules LC are aligned in the first direction DR1, the polarization control layer LCP may function as a polarization layer having a transmission axis parallel to the first direction DR1.

FIG. 4B illustrates a case in which the alignment direction of the liquid crystal molecules LC is parallel to the second direction DR2. In this case, the external light LS provided from an upper side of the polarization control layer LCP may pass through the polarization control layer LCP to provide second polarized light Ly polarized in the direction parallel to the second direction DR2 to the nano structure layer MCP. That is, when the liquid crystal molecules LC are aligned in the second direction DR2, the polarization control layer LCP may function as a polarization layer having a transmission axis parallel to the second direction DR2.

FIGS. 4A and 4B illustrate a case in which the alignment direction of the nano structures MA is parallel to the first direction DR1. When the alignment direction of the liquid crystal molecules LC of the polarization control layer LCP is controlled in the direction parallel to the long axis diameter of the nano structures MA as illustrated in FIG. 4A, the light provided to the nano structures MA is maximized, and thus, reflectance of the light reflected and emitted from the nano structures MA may be also maximized. In addition, when the alignment direction of the liquid crystal molecules LC of the polarization control layer LCP is controlled in the direction parallel to the short axis diameter of the nano structures MA as illustrated in FIG. 4B, the light provided to the nano structures MA is minimized, and thus, the reflectance of the light reflected and emitted from the nano structures MA may be also minimized. In this specification, a direction of the polarized light provided when the alignment direction of the liquid crystal molecules LC of the polarization control layer LCP is parallel to the long axis diameter of the nano structures MA is referred to as a polarization angle of about 0°, and a direction of the polarized light provided when the alignment direction of the liquid crystal molecules LC of the polarization control layer LCP is parallel to the short axis diameter of the nano structures MA is referred to as a polarization angle of about 90°.

The color filter according to an embodiment may include the nano structure layer MCP including the plurality of nano structures MA and the polarization control layer LCP disposed on the nano structure layer MCP and providing polarization that variably varies in a polarization angle ranging of about 0° to about 90° to easily control a color according to the provided electric field. In addition, the color filter according to an embodiment may easily control the polarized light provided from each of the nano structures to combine various reflected light emitted from the nano structures, thereby realizing excellent color reproducibility. In addition, the color filter according to an embodiment may include the plurality of nano structures MA that receive light in the visible light region to reflect and express light having a specific wavelength region and thus may be used as a reflective color filter having excellent color reproducibility.

Figure 5A:
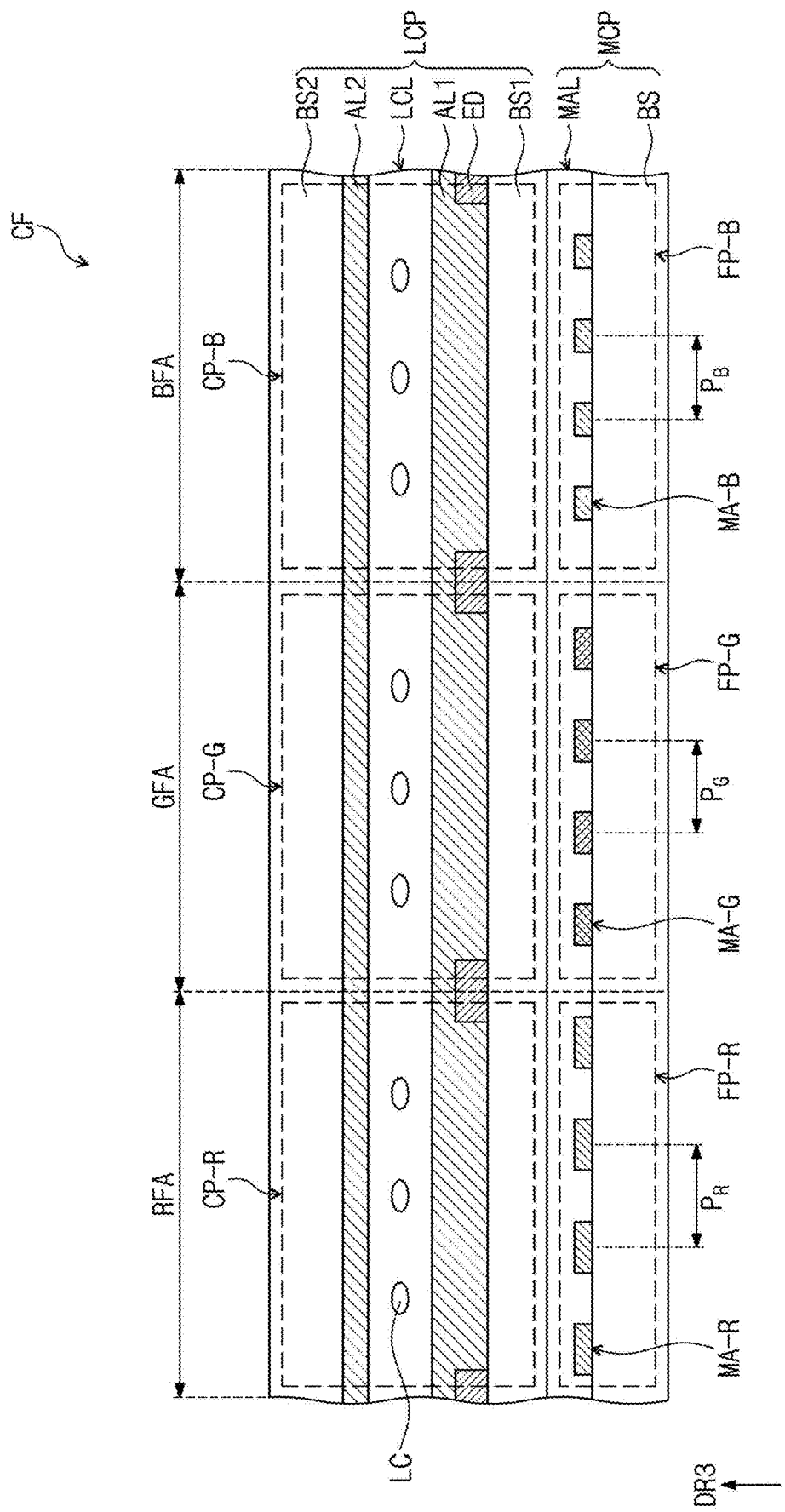
FIG. 5A is a cross-sectional view of the color filter according to an embodiment of the inventive concept.

FIG. 5A is a cross-sectional view of the color filter according to an embodiment of the inventive concept, and FIG. 5B is a plan view of the nano structure layer according to an embodiment of the inventive concept.

Referring to FIGS. 5A and 5B, the color filter CF according to an embodiment may be divided into a first filter area RFA, a second filter area GFA, and a third filter area BFA, which provide light having different wavelength ranges. In an embodiment, the first filter area RFA may provide light having a first wavelength region, the second filter area GFA may provide light having a second wavelength region with a wavelength shorter than the first wavelength, and the third filter area BFA may provide light having a third wavelength region with a wavelength shorter than the second wavelength. For example, in an embodiment, the first filter area RFA, the second filter area GFA, and the third filter area BFA may be areas providing red light, green light, and blue light, respectively. In addition, the first filter area RFA, the second filter area GFA, and the third filter area BFA may be areas providing cyan light, magenta light, and yellow light, respectively. However, the embodiment is not limited thereto, and the wavelength regions of light provided from the first to third filter areas RFA, GFA, and BFA may be variously combined according to a color combination required in the color filter CF according to an embodiment.

Referring to FIGS. 5A and 5B, the color filter CF according to an embodiment may include the nano structure layer MCP, and the nano structure layer MCP may include a plurality of first nano structures MA-R emitting the light having the first wavelength region, a plurality of second nano structures MA-G emitting the light having the second wavelength region, and a plurality of third nano structures MA-B emitting the light having the third wavelength region. For example, in one embodiment, the first nano structures MA-R may be red nano structures providing reflected light as red light, the second nano structures MA-G may be green nano structures providing reflected light as green light, and the third nano structures MA-B may be blue nano structures that provide reflected light as blue light. However, the embodiment is not limited thereto, and the wavelength and shade of the emitted light may be adjusted according to the arrangement interval, size, and the like of each of the nano structures.

Each of the first nano structures MA-R, the second nano structures MA-G, and the third nano structures MA-B, which emit light having different wavelength ranges, may have an elliptical shape on the plane. Each of the first nano structure MA-R, the second nano structure MA-G, and the third nano structure MA-B may be made of a dielectric material and may have a nanoscale size.

In an embodiment, the first nano structures MA-R may be disposed to be spaced a first arrangement interval PR from each other, the second nano structures MA-G may be disposed to be spaced a second arrangement interval PG from each other, and the third nano structures MA-B may be disposed to be spaced a third arrangement interval PB from each other. The first to third arrangement intervals PR, PG, and PB may correspond to arrangement intervals in the long axis direction of the first to third nano structures MA-R, MA-G, and MA-B, respectively. In an embodiment, the arrangement intervals PR, PG, and PB of the first to third nano structures MA-R, MA-G, and MA-B may be less than wavelengths of the light reflected and emitted from the nano structures, respectively.

In an embodiment, the first arrangement interval PR may be less than the first wavelength, the second arrangement interval PG may be less than the second wavelength, and the third arrangement interval PB may be less than the third wavelength. The third arrangement interval PB may be equal to or less than the second arrangement interval PG, and the second arrangement interval PG may be equal to or less than the first arrangement interval PR. That is, as the arrangement interval of the nano structures decreases, light having a short wavelength region may be provided. For example, in an embodiment, each of the arrangement intervals PR, PG, and PB of the nano structures MA-R, MA-G, and MA-B may be about 300 nm or more and about 450 nm or less. However, the embodiment is not limited thereto, and the arrangement intervals PR, PG, and PB may be adjusted in consideration of a wavelength of a color required in a range less than the wavelength in the visible light region.

A long axis diameter Ra-R of the first nano structure MA-R may be greater than a long axis diameter Ra-G of the second nano structure MA-G, and the long axis diameter Ra-G of the second nano structure MA-G may be greater than a long axis diameter Ra-B of the third nano structure MA-B. That is, as the long axis diameter decreases, the light having the short wavelength region may be provided. For example, in an embodiment, each of the long axis diameters Ra-R, Ra-G, and Ra-B of the nano structures MA-R, MA-G, and MA-B may be about 150 nm to about 400 nm. The long axis diameters Ra-R, Ra-G, and Ra-B of the nano structures MA-R, MA-G, and MA-B may be adjusted in consideration of the wavelength of the color required in a range less than the wavelength in the visible light region.

The nano structure layer MCP may include a first filter part FP-R corresponding to the first filter area RFA, a second filter part FP-G corresponding to the second filter area GFA, and a third filter part FP-B corresponding to the third filter area BFA. The first filter part FP-R may include the first nano structures MA-R providing the light having the first wavelength region, the second filter part FP-G may include the second nano structure MA-G providing the light having the second wavelength region, and the third filter part FP-B may include the third nano structures MA-B providing the light having the third wavelength region.

That is, the color filter CF according to an embodiment may include the first to third filter parts FP-R, FP-G, and FP-B that emit the light having the different wavelength ranges. The color filter CF according to an embodiment may include a plurality of first filter parts FP-R, a plurality of second filter parts FP-G, and a plurality of third filter parts FP-B. For example, in one embodiment, the first filter part FP-R, the second filter part FP-G, and the third filter part FP-B may be sequentially disposed to be repeated in the first direction DR1, and each of the first filter parts FP-R, the second filter parts FP-G, and the third filter parts FP-B may be repeatedly disposed in a row in the second direction DR2. That is, the first filter parts FP-R, the second filter parts FP-G, and the third filter parts FP-B may be arranged in a stripe shape extending in the second direction DR2. However, the embodiment of the inventive concept is not limited thereto. In an embodiment, each of the first filter parts FP-R, the second filter parts FP-G, and the third filter parts FP-B may be referred to as a sub-pixel. The color filter according to an embodiment may display an image according to a selective operation combination of the sub-pixels. The plurality of nano structures may be provided in each of the filter parts FP-R, FP-G, and FP-B corresponding to the sub-pixels in the color filter CF according to an embodiment.

In the color filter CF according to an embodiment, the number of first filter parts FP-R, the second filter parts FP-G, and the third filter parts FP-B may be the same. That is, the number of first filter parts FP-R, the second filter parts FP-G, and the third filter parts FP-B may have a ratio of 1:1:1. However, the embodiment is not limited thereto, and the arrangement of the filter parts and the number ratio between the filter parts may be adjusted in consideration of a color sense required for the color filter CF, a color temperature of white light, a shade, and the like.

Referring to FIG. 5B, a long axis direction Lax-R of the first nano structures MA-R, a long axis direction Lax-G of the second nano structures MA-G, and a long axis direction Lax-B of the third nano structures MA-B may be parallel to the first directional axis DR1. The arrangement directions of the nano structures MA-R, MA-G, and MA-B may correspond to the long axis directions Lax-R, Lax-G, and Lax-B of each of the nano structure, and in an embodiment illustrated in FIG. 5B, the arrangement directions of the first nano structures MA-R, the second nano structures MA-G, and the third nano structures MA-B may be parallel to the first directional axis DR1. That is, in an embodiment, the arrangement directions of the first nano structures MA-R, the second nano structures MA-G, and the third nano structures MA-B may be the same. However, the embodiment is not limited thereto, and an arrangement direction of a group of at least one nano structures of the first nano structures MA-R, the second nano structures MA-G, or the third nano structures MA-B may be different from that of a group of other nano structures.

Referring again to FIG. 5A, the color filter CF according to an embodiment may be disposed on the nano structure layer MCP and include the polarization control layer LCP including the liquid crystal layer LCL. As described with reference to FIG. 1, the polarization control layer LCP may include a plurality of switching electrodes disposed to be spaced apart from each other on the first and second substrates BS1 and BS2, which face each other, and a top surface of the first substrate BS1 and a liquid crystal layer LCL disposed between the first substrate BS1 and the second substrate BS2 and including liquid crystal molecules LC of which an alignment direction is controlled by an electric field between the adjacent switching electrodes ED. In addition, the polarization control layer LCP may further include a first alignment layer AL1 and a second alignment layer AL2.

In an embodiment, the polarization control layer LCP may include a first light control part CP-R corresponding to the first filter area RFA, and a second light control part CP-G corresponding to the second filter area GFA, and a third light control part CP-B corresponding to the third filter area BFA. The alignment direction of the liquid crystal molecules LC may be independently controlled by the first to third light control parts CP-R, CP-G, and CP-B. The alignment direction of the liquid crystal molecules LC may correspond to an extension direction of the long axes of the liquid crystal molecules LC.

The first light control part CP-R, the second light control part CP-G, and the third light control part CP-B may independently control the polarization directions of the light provided to the first filter part FP-R, the second filter part FP-G, and the third filter part FP-B, respectively. That is, the polarization direction of the light provided from an upper side of the polarization control layer LCP may be differently controlled in the first light control part CP-R, the second light control part CP-G, and the third light control part CP-B, and the polarization direction of the light transmitted through each of the first to third light control parts CP-R, CP-G, and CP-B may have a polarization angle in a range of about 0° to about 90°. When the polarization angle is about 90°, i.e., when the alignment direction of the liquid crystal molecules LC of the polarization control layer LCP is parallel to the short axis diameter of the nano structures MA, it may be explained that the color filter CF is turned off. The alignment direction of the liquid crystal molecules LC disposed in each of the first to third light control parts CP-R, CP-G, and CP-B may be adjusted to control the polarization direction of the light provided to each of the first to third filter parts FP-R, FP-G, and FP-B, and thus, the wavelengths and amounts of light emitted from the first to third filter areas RFA, GFA, and BFA may be variously combined with each other. Thus, the color filter according to an embodiment may be electrically controlled in color and may express shades and various colors to realize excellent color reproducibility.

Figure 6:
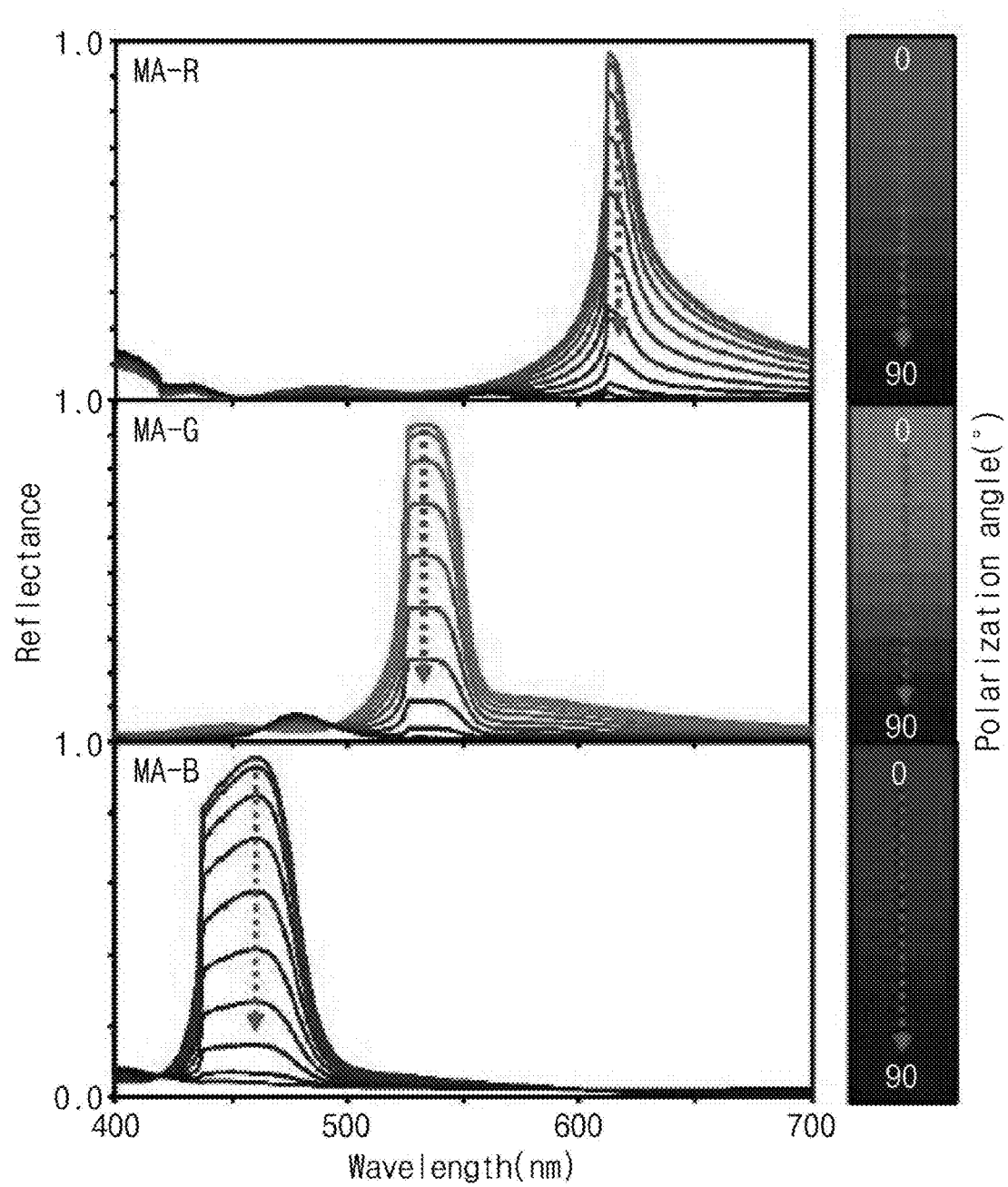
FIG. 6 is a view illustrating a variation in reflected light according to a polarization direction.
Figure 7:
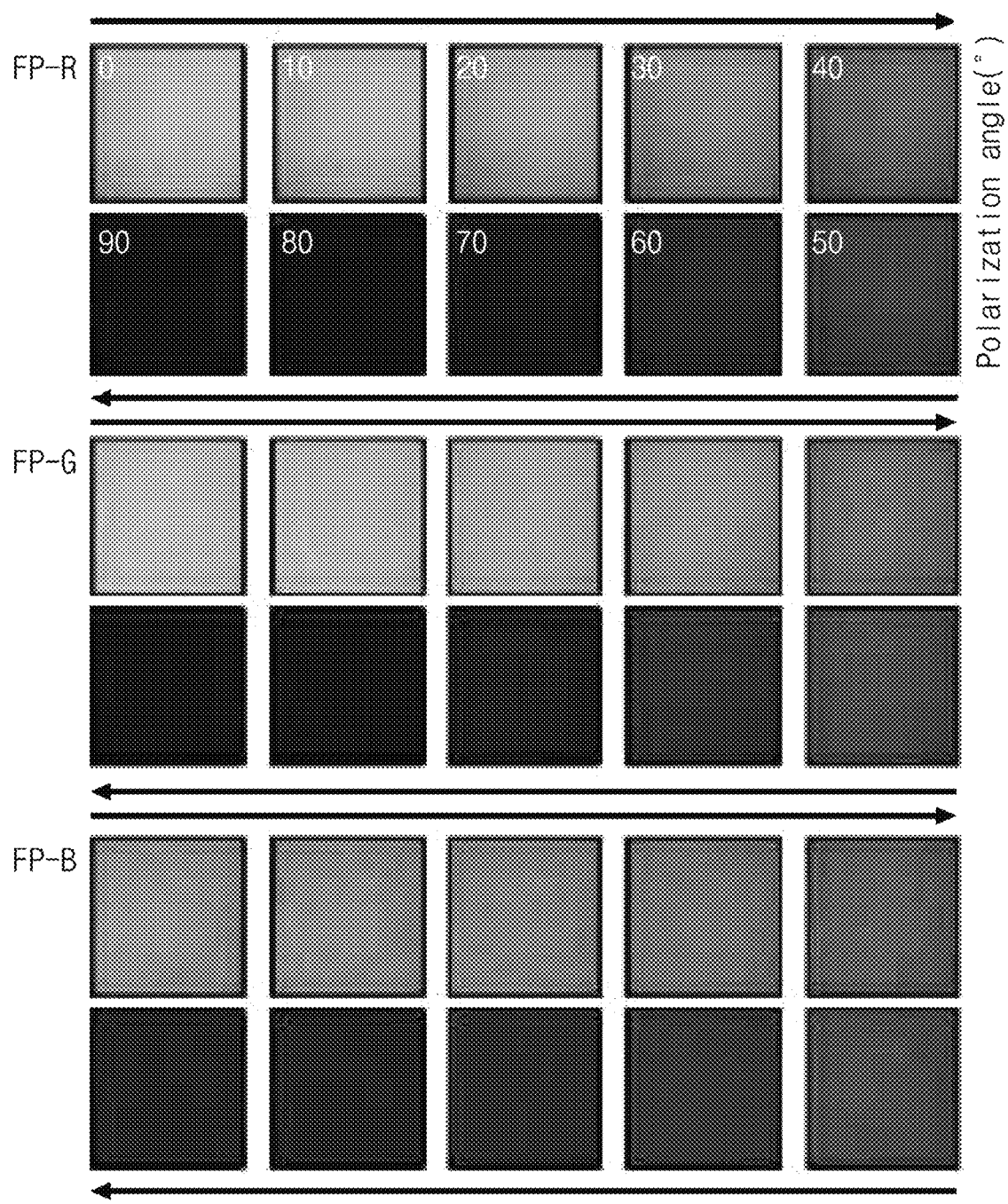
FIG. 7 is a view illustrating a variation in color according to the polarization direction.

FIG. 6 is a view illustrating reflectance of the nano structures according to the polarization angle of the provided light. FIG. 7 is an image illustrating a variation in color of filter parts according to the polarization angle of the provided light. Also, FIG. 8 is a CIE 1931 chromaticity diagram illustrating a color coordinate of the nano structure layer according to an embodiment.

Figure 8:
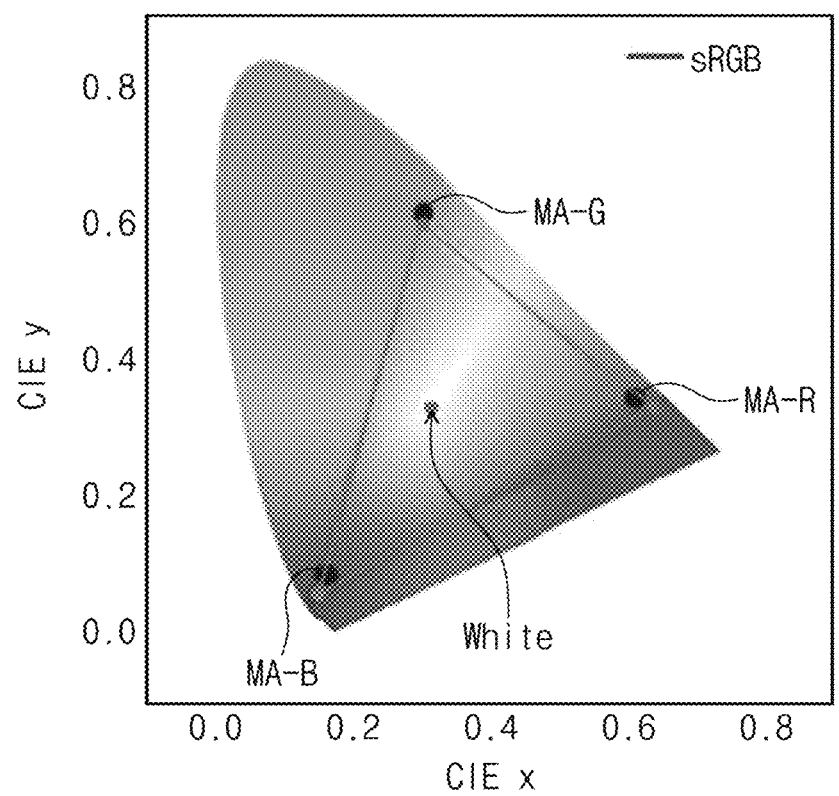
FIG. 8 is a view illustrating a color coordinate in nano structure layer according to an embodiment of the inventive concept.

FIGS. 6 to 8 illustrate optical properties of a first nano structure MA-R having a long axis diameter of about 336 nm, a short axis diameter of about 118 nm, and an arrangement interval of about 420 nm, a second nano structure MA-G having a long axis diameter of about 266 nm, a short axis diameter of about 112 nm, and an arrangement interval of about 360 nm, and a third nano structure MA-B having a long axis diameter of about 204 nm, a short axis diameter of about 73 nm, and an arrangement interval of about 300 nm. In addition, each of the first to third nano structures MA-R, NA-G, and MA-B used for evaluation illustrated in FIGS. 6 to 8 may have a thickness of about 140 nm. The arrangement interval of the nano structures may correspond to a length of one side of the base substrate BS (see FIG. 9A) on which the nano structures are disposed.

A direction of an arrow indicated in FIG. 6 may indicate a direction of variation in reflectance according to the variation of the polarization angle. Referring to FIG. 6, the first nano structure MA-R may emit red light having a peak wavelength of about 610 nm to about 620 nm, and the reflectance of the reflected light emitted from the first nano structure MA-R may decrease as the polarization angle increases. In addition, the second nano structure MA-G may emit green light having a peak wavelength of about 530 nm to about 550 nm, and the third nano structure MA-B may emit blue light having a peak wavelength of about 450 nm to about 470 nm. It is seen that the reflectance of the reflected light emitted from each of the second nano structure MA-G and the third nano structure MA-B also decreases as the polarization angle increases. In addition, it is seen that the color sense of light emitted from each of the first to third nano structures MA-R, NA-G, and MA-B also varies as the polarization angle increases.

FIG. 7 is an image illustrating a variation in color according to the polarization angles of the light provided to the first to third filter parts FP-R, FP-G, and FP-B. A direction of an arrow in FIG. 7 corresponds to an increasing direction of the polarization angle. Referring to FIG. 7, a color sense and shade of light emitted from each of the filter parts FP-R, FP-G, and FP-B may vary according to the polarization angle. That is, the color filter according to an embodiment may combine the filter parts FP-R, FP-G, and FP-B, and the polarization angles provided to the filter parts FP-R, FP-G, and FP-B to express various colors.

FIG. 8 is a CIE 1931 chromaticity diagram. In FIG. 8, an area indicated by an sRGB line corresponds to a standard color space, and a "white" point indicates a color coordinate of the standard white light. In FIG. 8, a point indicated by reference symbol MA-R corresponds to a color coordinate of light emitted from the first nano structure, a point indicated by reference symbol MA-G corresponds to a color coordinate of light emitted from the second nano structure, and a point indicated by reference symbol MA-B corresponds to a color coordinates of light emitted from the third nano structure. Considering the color coordinates of light emitted from the first to third nano structures MA-R, NA-G, and MA-B illustrated in FIG. 8, color reproducibility of the color filter according to an embodiment, which includes the first to third nano structures MA-R, NA-G, and MA-B, may be expected to have a level similar to that of the sRGB.

The color filter according to an embodiment may include nano structures having different sizes in each of the filter parts FP-R, FP-G, and FP-B. In addition, the color filter according to an embodiment may include four or more filter parts emitting light having different wavelength ranges. In this case, all of the nano structures provided in one filter part may have the same size, and the nano structures provided in the filter parts different from each other may have different sizes.

Figure 9A:
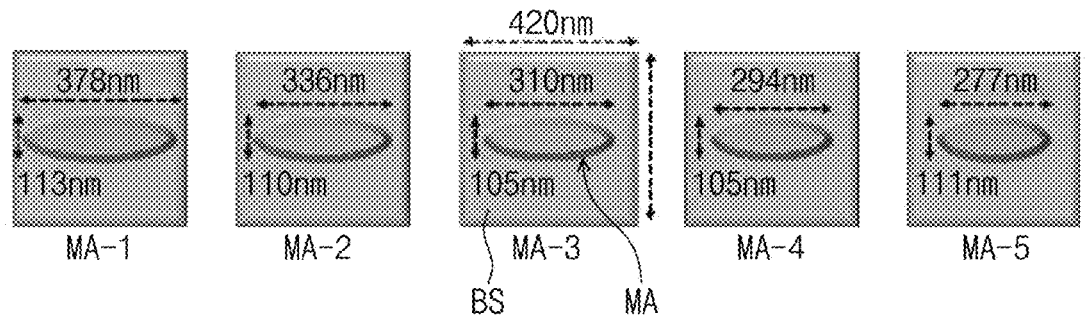
FIG. 9A is a view illustrating an example of shapes of nano structures according to an embodiment of the inventive concept.
Figure 9B:
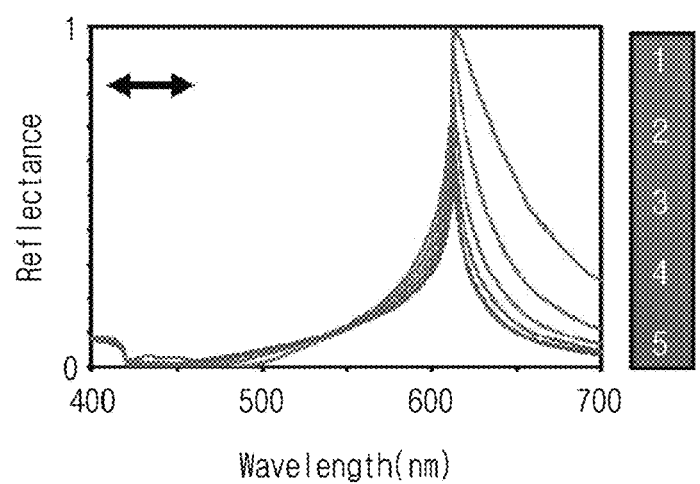
FIG. 9B and FIG. 9C are views illustrating a variation in reflected light depending on types of the nano structure according to an embodiment of the inventive concept.
Figure 9C:
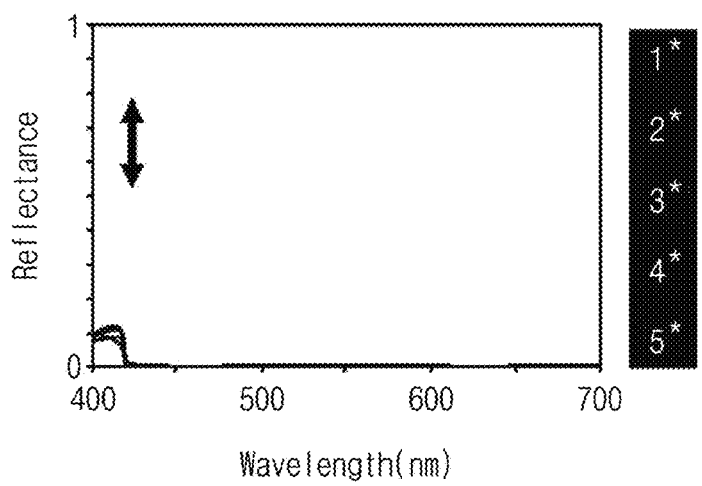

FIG. 9A is a view illustrating an example of types of nano structures having different sizes and arrangement intervals. FIG. 9B and FIG. 9C are views illustrating a variation in reflectance according to types of nano structures. Also, FIG. 9C illustrates an image displayed by each of color filters provided in different types of nano structures.

Referring to FIG. 9A, each of No. 1 to No. 5 nano structures MA-1, MA-2, MA-3, MA-4, and MA-5 may have an elliptical shape on a plane and be disposed on the base substrate BS. As illustrated in FIG. 9A, the No. 1 to No. 5 nano structures MA-1, MA-2, MA-3, MA-4, and MA-5 may have the same arrangement interval and have long axis diameters different from each other. Here, there is a difference in a ratio of a short axis diameter to the long axis diameter. The arrangement interval of the nano structures may correspond to a width in one direction of the base substrate BS on which the nano structures MA are disposed, and the arrangement interval may correspond to a width of one surface of the base substrates BS in a direction parallel to the long axis diameter of the nano structures. The arrangement interval may include a sufficient margin for the nano structures MA to be disposed on the base substrate BS. Here, the arrangement interval may be larger than the long axis diameter of the nano structure MA and may vary according to a wavelength of light required for expression in the nano structure MA.

FIG. 9B and FIG. 9C illustrate a comparison of reflectance according to the types of nano structures. FIG. 9B illustrates reflectance when the polarization angle is about 0°, and FIG. 9C illustrates reflectance when the polarization angle is about 90°. Referring to FIG. 9C, all of the No. 1 to No. 5 nano structures MA-1, MA-2, MA-3, MA-4, and MA-5 have similar reflectance characteristics. That is, when the polarization angle of the light provided to the nano structures is about 90°, light perpendicular to the long axis of each of the nano structures may be incident. Therefore, the light reflected and emitted from the nano structures may be minimized, and thus, the reflectance in the visible region may be minimized. In addition, referring to FIG. 9B, it is seen that the reflectance of the light reflected from the nano structures MA gradually decreases from the No. 1 nano structure MA-1 to the No. 5 nano structure MA-5, in which the nano structures decrease in size. In addition, it is seen that the peak wavelength of the light reflected from the nano structures MA shifts to a partial short wavelength region from the No. 1 nano structure MA-1 to the No. 5 nano structure MA-5. That is, in an embodiment, colors having different color senses and shades may be realized by adjusting the long axis diameter and the ratio of the long axis diameter to the short axis diameter of each of the nano structures, each of which has the elliptical shape on the plane.

FIGS. 9D and 9E illustrate an example of displaying an image using the No. 1 to No. 5 nano structures MA-1, MA-2, MA-3, MA-4, and MA-5. FIG. 9D illustrates an image when the polarization angle is about 0°, and FIG. 9E illustrates an image when the polarization angle is about 90°. The numbers indicated in FIG. 9D correspond to image areas indicated by the No. 1 to No. 5 nano structures MA-1, MA-2, MA-3, MA-4, and MA-5, respectively. Referring to FIG. 9D, even when polarized light having the same polarization angle is provided, it is confirmed that images having different color senses and different shades are realized according to the types of nano structures. In addition, referring to FIG. 9E, it is confirmed that good black is implemented in all areas regardless of the types of nano structures. Therefore, the color filter according to an embodiment may have the same arrangement interval and include a combination of the nano structures having different sizes. As a result, light having the different color senses and shades may be emitted from the different nano structures to express the high color reproducibility and the excellent color close to the natural color.

Figure 10:
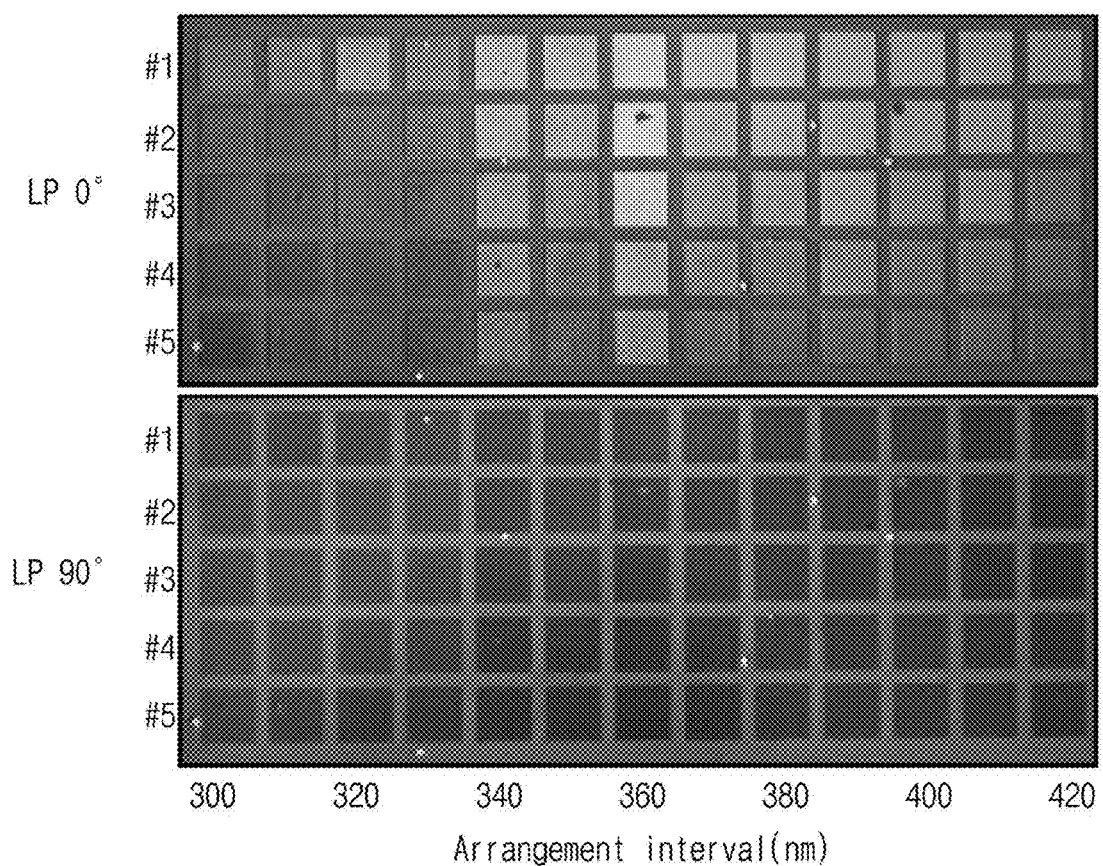
FIG. 10 is an image illustrating a color depending on types of the nano structure according to an embodiment of the inventive concept.

Table 1 below shows a combination of the arrangement intervals and sizes of the nano structures. FIG. 10 is an image illustrating a color of light emitted from each of the nano structures having the combination of the arrangement intervals and sizes in Table 1. In Table 1 below, reference symbol Ra is a diameter of the long axis of the nano structure, and reference symbol Rb is a diameter of the short axis of the nano structure. In addition, the arrangement interval in Table 1 corresponds to an arrangement interval at which the nano structures are disposed, and the arrangement interval in Table 1 corresponds to a length of one surface of the base substrate on which the nano structures are disposed as illustrated in FIG. 9A.

TABLE 1

| Classification | Number of nano structures | | | | | | | | | |
|---|---|---|---|---|---|---|---|---|---|---|
| | #1 | | #2 | | #3 | | #4 | | #5 | |
| Arrangement interval (nm) | Ra (nm) | Rb (nm) | Ra (nm) | Rb (nm) | Ra (nm) | Rb (nm) | Ra (nm) | Rb (nm) | Ra (nm) | Rb (nm) |
| 300 | 234 | 70 | 216 | 67 | 204 | 71 | 192 | 71 | 180 | 79 |
| 310 | 248 | 74 | 217 | 69 | 205 | 72 | 192 | 75 | 186 | 84 |
| 320 | 256 | 77 | 224 | 72 | 211 | 74 | 198 | 75 | 192 | 86 |
| 330 | 251 | 75 | 231 | 76 | 218 | 78 | 205 | 80 | 198 | 85 |
| 340 | 258 | 78 | 245 | 81 | 231 | 83 | 218 | 87 | 204 | 88 |
| 350 | 266 | 93 | 252 | 88 | 238 | 83 | 224 | 85 | 210 | 88 |
| 360 | 288 | 109 | 274 | 109 | 259 | 114 | 245 | 110 | 230 | 104 |
| 370 | 289 | 110 | 266 | 107 | 252 | 106 | 244 | 107 | 229 | 103 |
| 380 | 319 | 112 | 296 | 104 | 274 | 101 | 251 | 100 | 236 | 104 |
| 390 | 351 | 105 | 320 | 102 | 304 | 103 | 281 | 104 | 250 | 105 |
| 400 | 360 | 108 | 336 | 104 | 312 | 100 | 288 | 98 | 272 | 98 |
| 410 | 369 | 111 | 353 | 109 | 328 | 108 | 303 | 103 | 287 | 100 |
| 420 | 378 | 113 | 336 | 111 | 311 | 106 | 294 | 106 | 277 | 111 |

FIG. 10 illustrates a reflection color displayed by each of the nano structures having a combination of arrangement intervals of the nano structures and sizes of the nano structures, which are disclosed in Table 1. An image of a portion displayed as reference symbol "LP 0°" in FIG. 10 corresponds to a case in which a polarization angle of light provided to the nano structures is about 0°, and an image of a portion displayed as reference symbol "LP 90°" corresponds to a case in which a polarization angle of light provided to the nano structures is about 90°. In addition, reference symbols #1 to #5 in FIG. 10 correspond to numbers of the nano structures in Table 1.

Referring to FIG. 10, it is seen that the nano structures implement various reflection colors according to the combination of the arrangement intervals, long axis diameters, and short axis diameters of the nano structures. Thus, the color filter according to an embodiment may have excellent color reproducibility by including the combination of the nano structures having various sizes and arrangement intervals.

That is, although FIG. 5B illustrates a color filter including three types of nano structures MA-R, MA-G, and MA-B according to an embodiment, the embodiment is not limited thereto. For example, the nano structures having different sizes may be disposed in each of filter parts FP-R, FP-G, and FP-B. For example, different types of nano structures having the same arrangement interval and different sizes may be disposed in each of the filter parts FP-R, FP-G, and FP-B. Also, unlike this, different types of nano structures having different arrangement intervals and different sizes may be disposed in each of the filter parts FP-R, FP-G, and FP-B.

Figure 11:
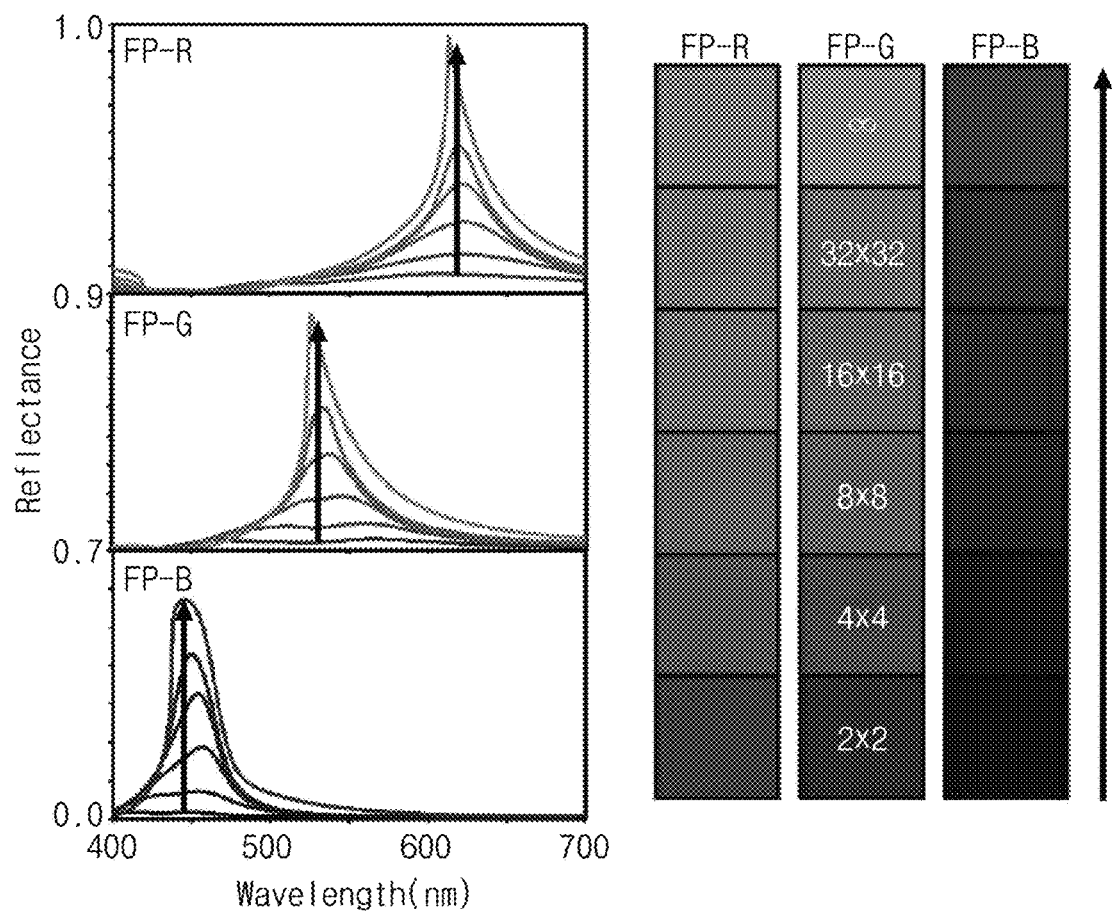
FIG. 11 is a view illustrating a variation in reflected light depending on the number of nano structures.

FIG. 11 is a view illustrating a variation in reflectance and color sense according to the number of arrangement of nano structures. FIG. 11 is a simulation result of variation in reflectance and color sense according to the number of nano structures disposed in one filter part.

In FIG. 11, "2×2", "4×4", "8×8", "16×16", and "32×32" correspond to the number of nano structures disposed in one filter part and means "the number in row direction x the number in column direction". In addition, reference symbol "∞" in FIG. 11 corresponds to a simulation result when infinite nano structures are disposed. A direction of an arrow in FIG. 11 is a direction in which the number of nano structures increases. Referring to the result in (a) of FIG. 11, it is seen that as the number of nano structures disposed in one filter part FP-R, FP-G, or FP-B, reflectance of the reflected light also increases, and a peak of the reflected light is also changed sharply to increase in color purity. Also, in (b) of FIG. 11 displayed as an image, it is seen that as the number of nano structures disposed in the filter parts FP-R, FP-G, and FP-B increases, a color sense of light in each wavelength region is also changed. Referring to the result of FIG. 11, it is seen that even when "4×4" nano structures are disposed in one filter part, colors of three wavelength regions, which are distinguished from each other and capable of being combined with each other, are realized. Accordingly, the color filter according to an embodiment may include "4×4" or more nano structures in each of the filter parts to realize good color reproducibility. In addition, in the color filter according to an embodiment, the number of nano structures disposed in each filter part may be adjusted according to required resolution.

Figure 12A:
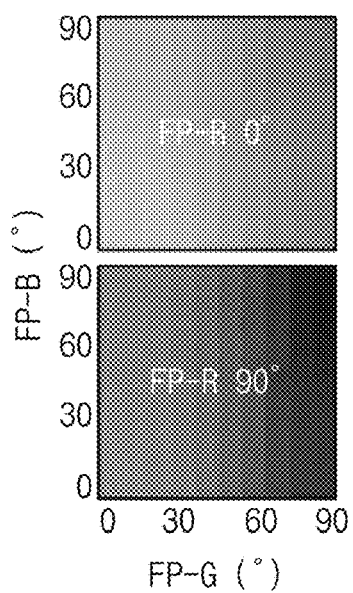
FIGS. 12A to 12C are views illustrating an example of color expression in the color filter according to an embodiment of the inventive concept.
Figure 12B:
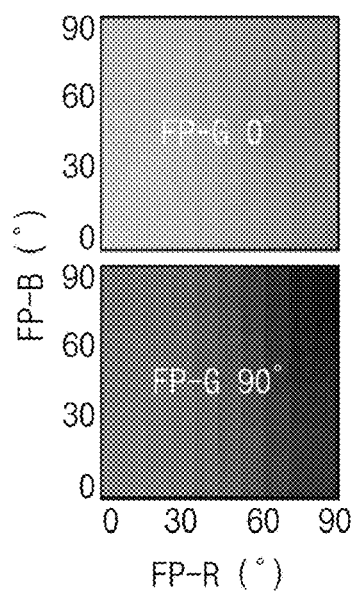
Figure 12C:
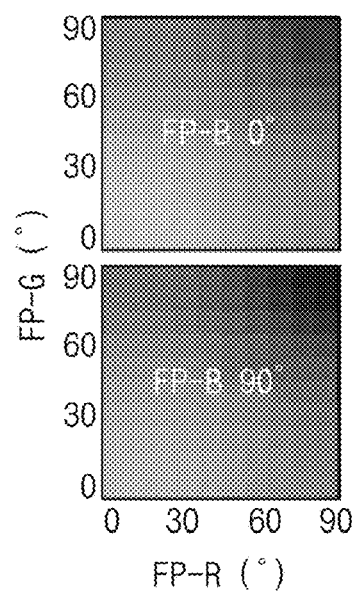

FIGS. 12A to 12C illustrate a structure of the color filter according to an embodiment, which is illustrated in FIG. 5B and is a view illustrating color expression according to a combination of polarization angles of light provided to the filter parts when a ratio of the number of first filter part FP-R, the second filter part FP-G, and the third filter part FP-B is 1:1:1.

In FIG. 12A, the polarization angle of light provided to the first filter part FP-R is fixed to about 0° and about 90°, and when the polarization angle of light provided to each of the second filter part FP-G and the third filter part FP-B is changed from about 0° to about 90°, a color expressed in the color filter is displayed. In addition, in FIG. 12B, the polarization angle of light provided to the second filter part FP-G is fixed to about 0° and about 90°, and when the polarization angle of light provided to each of the first filter part FP-R and the third filter part FP-B is changed from about 0° to about 90°, a color expressed in the color filter is displayed. In FIG. 12C, the polarization angle of light provided to the third filter part FP-B is fixed to about 0° and about 90°, and when the polarization angle of light provided to each of the first filter part FP-R and the second filter part FP-G is changed from about 0° to about 90°, a color expressed in the color filter is displayed. Referring to FIGS. 12A to 12C, the color filter according to an embodiment may include a polarization control layer including a liquid crystal layer disposed on the nano structures and having a liquid crystal alignment direction adjusted according to a provided electric field, and it is seen that various colors are realized by selectively adjusting and combining polarization angles of light provided to the filter parts FP-R, FP-G, and FP-B.

Figure 13A:
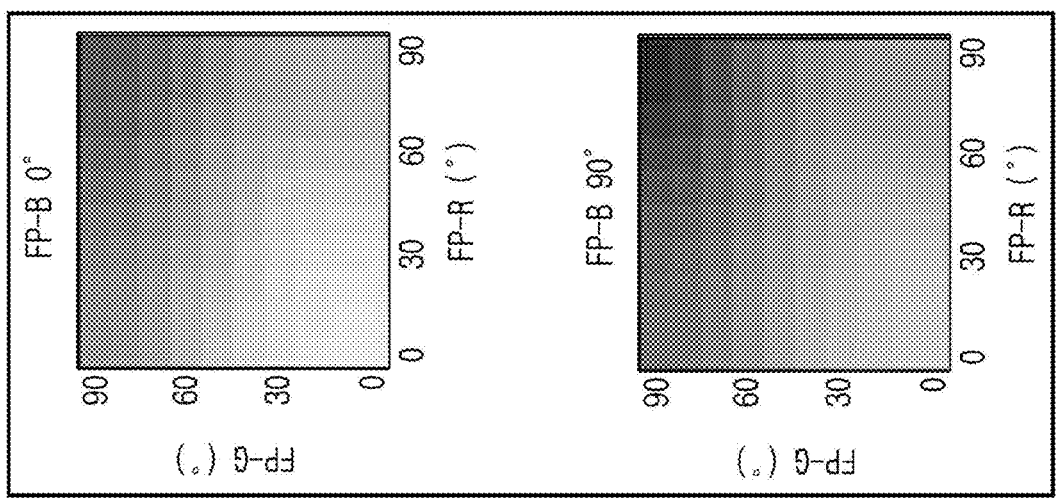
FIGS. 13A to 13C are views illustrating an example of color expression in the color filter according to an embodiment of the inventive concept.
Figure 13B:
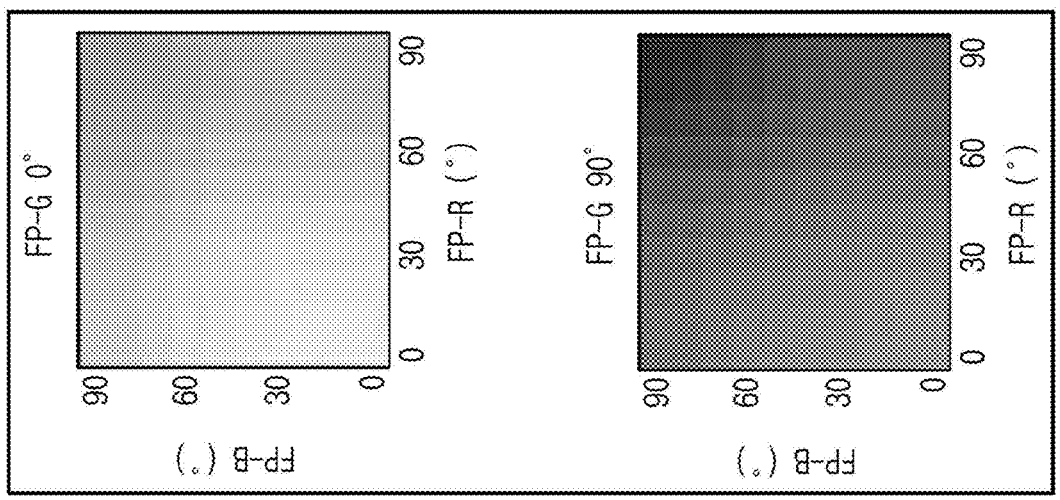
Figure 13C:
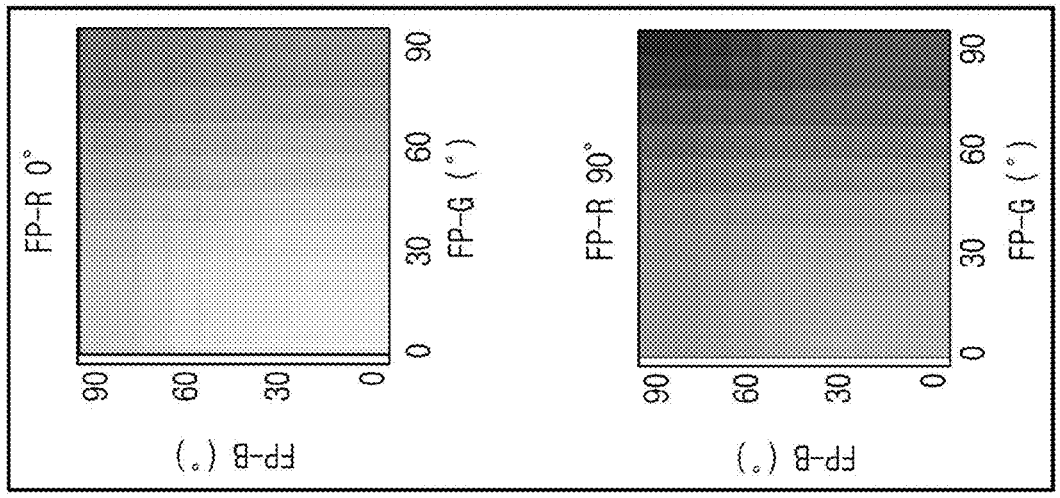

FIGS. 13A to 13C are views illustrating an example of color expression in the color filter according to an embodiment of the inventive concept. FIGS. 13A to 13C illustrate a laminated structure of the nano structure layer MCP and the polarization control layer LCP, like the color filter according to an embodiment illustrated in FIG. 5B. However, FIGS. 13A to 13C are views illustrating color expression according to a combination of polarization angles of light provided to the filter parts when a ratio of the number of first filter part FP-R, the second filter part FP-G, and the third filter part FP-B is 1:2:4.

In FIG. 13A, the polarization angle of light provided to the first filter part FP-R is fixed to about 0° and about 90°, and when the polarization angle of light provided to each of the second filter part FP-G and the third filter part FP-B is changed from about 0° to about 90°, a color expressed in the color filter is displayed. In addition, in FIG. 13B, the polarization angle of light provided to the second filter part FP-G is fixed to about 0° and about 90°, and when the polarization angle of light provided to each of the first filter part FP-R and the third filter part FP-B is changed from about 0° to about 90°, a color expressed in the color filter is displayed. In FIG. 13C, the polarization angle of light provided to the third filter part FP-B is fixed to about 0° and about 90°, and when the polarization angle of light provided to each of the first filter part FP-R and the second filter part FP-G is changed from about 0° to about 90°, a color expressed in the color filter is displayed. Comparing FIGS. 13A to 13C, and 12A to 12C, it is seen that the color filters having different ratios of the number of filter parts express different colors. In this embodiment of this specification, the color filter, in which the ratio of the number of first filter part FP-R, the second filter part FP-G, and the third filter part FP-B is 1:2:4, according to an embodiment, which is illustrated in FIGS. 13A to 13C, expresses a color sense closer to the natural color. However, the embodiment is not limited thereto, and the color sense may vary according to a combination of the number of filter parts according to the sizes, the arrangement intervals, and the like of the used nano structures.

In addition, color senses of white and black displayed in the color filter may vary according to the ratio of the number of first filter part FP-R, the second filter part FP-G, and the third filter part FP-B. A white color temperature displayed in the color filter may vary according to the ratio of the number of first filter part FP-R, the second filter part FP-G, and the third filter part FP-B.

FIGS. 14A to 14C illustrate an image in which white and black are expressed in the color filters according to an embodiment, and FIG. 14D illustrates a variation in white color coordinate in color filters according to an embodiment.

In the evaluation results illustrated in FIGS. 14A to 14C, and FIG. 14D, FIG. 14A corresponds to a case in which the ratio of the number of first filter part, the second filter part, and third filter part is 1:1:1 in the color filter according to an embodiment, FIG. 14B corresponds to a case in which the ratio of the number of first filter part, the second filter part, and third filter part is 1:1:2 in the color filter according to an embodiment, and FIG. 14C corresponds to a case in which the ratio of the number of first filter part, the second filter part, and third filter part is 1:2:4 in the color filter according to an embodiment. The first filter part may include a nano structure providing red light, the second filter part may include a nano structure providing green light, and the third filter part may include a nano structure providing blue light.

Referring to FIGS. 14A to 14C, it is seen that the white color sense and black color sense vary according to the ratio of the number of first to third filter parts. It is seen that as the number of third filter parts providing the blue light relatively increases, the color filter according to an embodiment expresses white light having a higher color temperature, and as the number of third filter parts providing the blue light relatively decreases, the color filter expresses white light having a lower color temperature, and the black color is expressed more clearly. Also, referring to FIG. 14D, it is seen that as the ratio of the number of filter parts varies from FIG. 14A to FIG. 14C, the white light having a reddish color sense is changed to the white light having the blue color sense.

Thus, the color filter according to an embodiment may include filter parts providing light having different wavelength ranges and may express a desired color by optimizing the combination of the number of filter parts.

Figure 15:
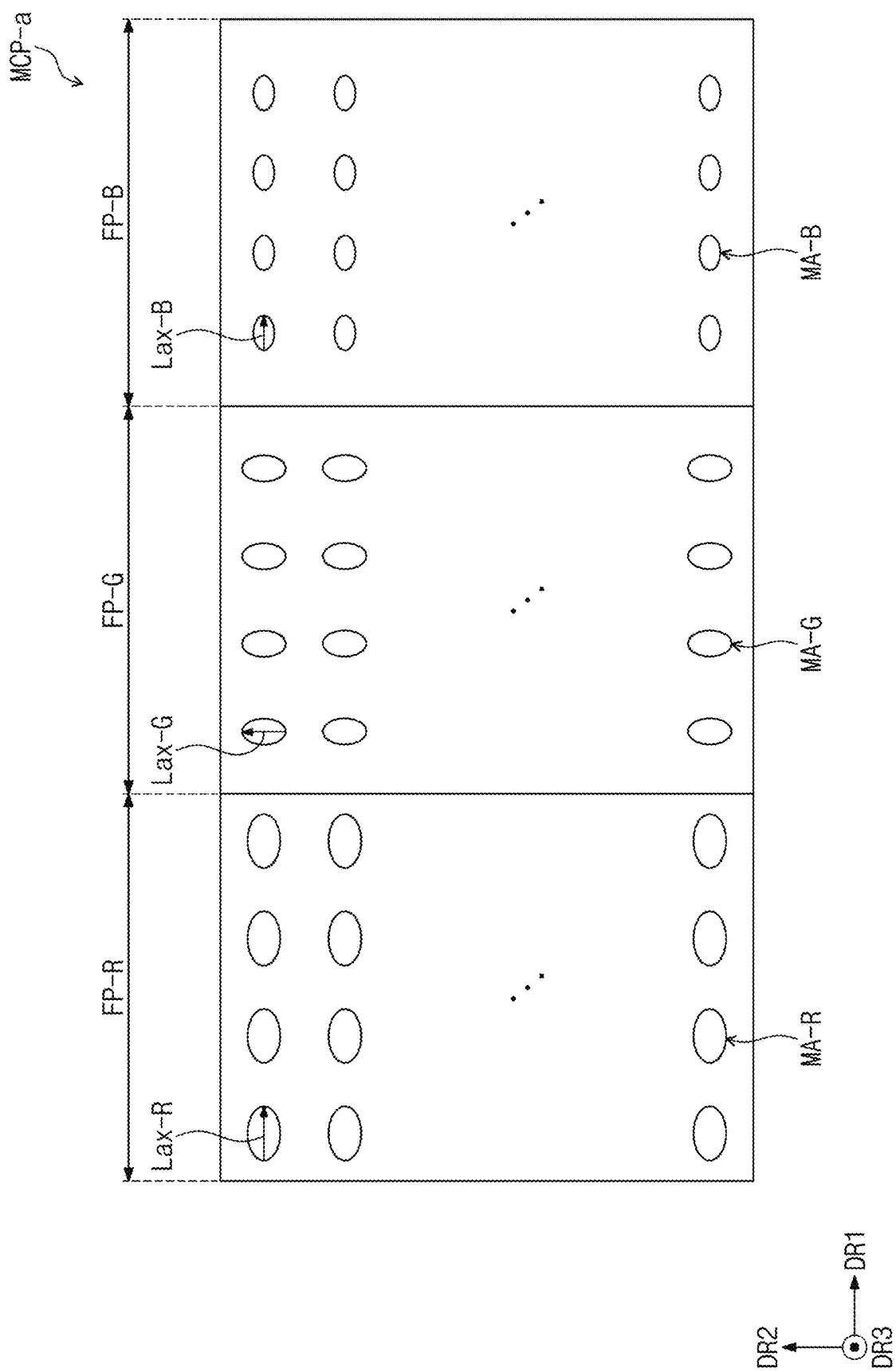
FIG. 15 is a plan view of a nano structure layer according to an embodiment of the inventive concept.

FIG. 15 is a plan view of a nano structure layer according to an embodiment, which is provided in the color filter according to an embodiment. Referring to FIG. 15, in a nano structure layer MCP-a according to an embodiment, an arrangement direction of nano structures MA-G disposed in one filter part FP-G is different from that of each of nano structures MA-R and MA-B disposed in other filter parts FP-R and FP-B.

In FIG. 15, a direction of a long axis diameter of each of the second nano structures MA-G disposed in the second filter part FP-G providing light in the second wavelength region is parallel to the second directional axis DR2. As a result, there is a difference in that each of directions of the long axis diameters of the first nano structures MA-R disposed in the first filter part FP-R and the third nano structures MA-B disposed in the third filter part FP-B is parallel to the first directional axis DR1. A polarization control layer including liquid crystal molecules may be disposed on the nano structure layer MCP-a illustrated in FIG. 15, and independently polarized light may be controlled and provided to each of the filter parts FP-R, FP-G, and FP-B.

Figure 16:
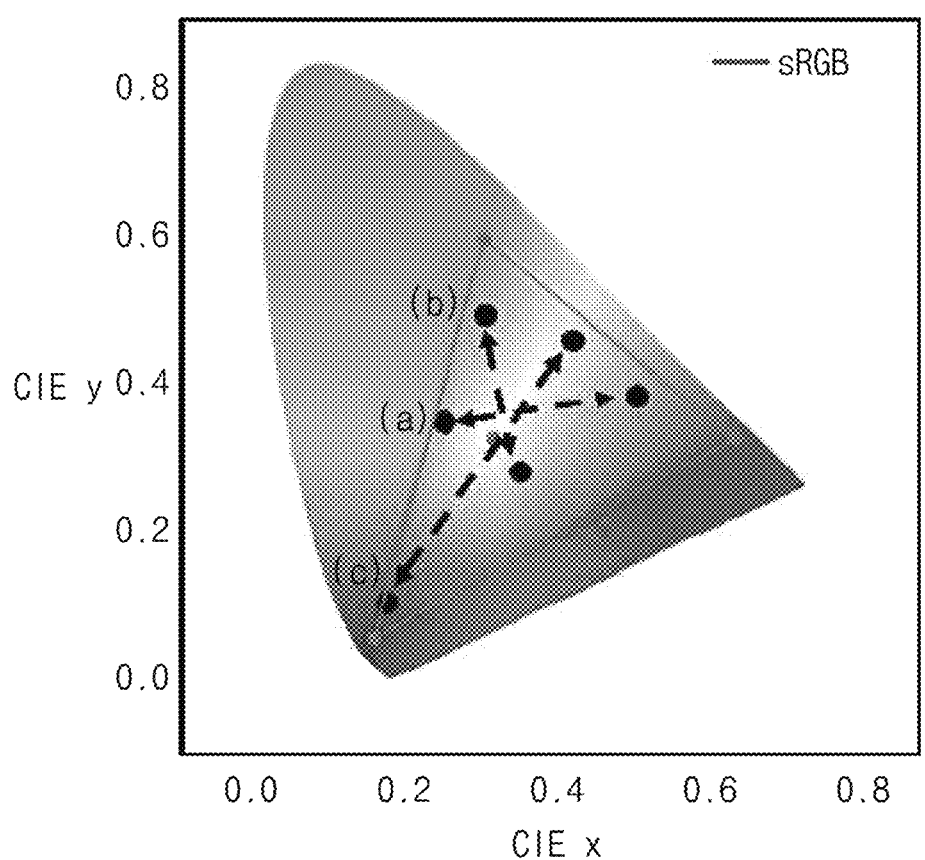
FIG. 16 is a view illustrating an example of a variation in color coordinate depending on arrangement directions of nano structures.

FIG. 16 illustrates an example of a variation in color coordinate when the arrangement direction of the nano structures disposed in one filter part among the nano structures disposed in the first to third filter parts is different from that of the nano structures disposed in the other filter parts. FIG. 16 illustrates a CIE 1931 chromaticity diagram, and an area indicated by an sRGB line in FIG. 16 corresponds to a standard color space.

A point b in FIG. 16 indicates a variation in color coordinate for the color filter having the arrangement of the nano structures illustrated in FIG. 15. In addition, a point a corresponds to a case in which the arrangement direction of the first nano structures MA-R disposed in the first filter part FP-R is parallel to the second directional axis DR2, and the second nano structures MA-G and the third nano structures MA-B are arranged in parallel with the first directional axis DR1, and a point c corresponds to a case in which the arrangement direction of the third nano structures MA-B disposed in the third filter part FP-B is parallel to the second directional axis DR2, and the first nano structures MA-R and the second nano structures MA-G are arranged in parallel with the first directional axis DR1.

Points indicated on both edges of an arrows indicated in FIG. 16 indicate color coordinates of the color filter when light having a polarization angle of about 0° or light having a polarization angle of about 90° is provided, respectively.

Referring to FIGS. 15 and 16, in the color filter according to an embodiment, which includes a plurality of filter parts, the arrangement direction of the nano structures provided in at least one filter part may be different from the arrangement direction of the nano structures provided in other filter parts. In the color filter according to an embodiment, which includes the nano structures having different arrangement directions, the polarization control layer disposed on the nano structure layer may provide independently controlled polarization to each of the filter parts. In addition, unlike this, in the color filter according to an embodiment, which includes the nano structures having different arrangement directions, the polarization control layer disposed on the nano structure layer may provide light polarized in the same direction to all of the filter parts. That is, an embodiment may provide the color filter capable of being displayed in various colors, which includes at least one filter part in which the nano structures having an arrangement direction different from those of the other filter parts are disposed.

the color filter according to an embodiment described with reference to FIGS. 1 to 16 may be provided in a display device or the like. An embodiment may provide a display device including the color filter according to the foregoing embodiments. The display device according to an embodiment may include a color filter according to an embodiment and a display element layer disposed under the color filter. The display element layer may be used without limitation as long as the display element layer is a configuration for implementing image information. The structure of the display device is not limited thereto, and in the display device according to an embodiment, the display element layer may be disposed above the color filter.

Also, although not shown, the color filter according to an embodiment may further include a front light source. The front light source may be disposed over the polarization control layer.

As described with reference to FIGS. 1 to 16, the color filter according to an embodiment may include the nano structures, each of which has the nanoscale size and has the elliptical shape on the plane, and also include the base that effectively reflects and emits the light from the nano structures and the polarization control layer that provides the polarized light that is adjustable in the nano structures to express the various colors and realize the excellent color reproducibility. In addition, to express the required color, the arrangement intervals of the nano structures, the sizes of the nano structures, and the number of filter parts including the nano structures may be provided in various combinations to provide the color filter that implements the various colors.

In addition, the color filter according to an embodiment may realize high luminous efficiency by effectively reflecting the external light using the nano structure including a dielectric and may exhibit low power consumption characteristics by expressing the color using the reflected light.

In an embodiment, the polarization control layer including the liquid crystal layer that is easy to adjust the alignment direction by the electric field may be provided to control the polarization direction of the light provided to each filter part, thereby providing the color filter that electrically controls the color sense and shade of the color to be expressed.

The color filter according to the embodiment may include the plurality of nano structures, each of which has an elliptical shape on the plane, and the liquid crystal layer that controls the amount and the polarization direction of the light provided to the nano structures to realize the high color reproducibility and the excellent display quality.

It will be apparent to those skilled in the art that various modifications and deviations can be made in the present invention. Thus, it is intended that the present invention covers the modifications and deviations of this invention provided they come within the scope of the appended claims and their equivalents.

Accordingly, the technical scope of the present invention should not be limited to the contents described in the detailed description of the specification, but should be determined by the claims.

What is claimed is:

1. A color filter comprising:
 a nano structure layer comprising a base substrate and a plurality of nano structures which are disposed to be spaced apart from each other on the base substrate and each of which has an elliptical shape on a plane; and
 a polarization control layer disposed on the nano structure layer and comprising liquid crystal molecules of which an alignment direction on a plane parallel to the base substrate is controlled by an electric field,
 wherein each nano structure of the plurality of nano structures has a first diameter in a first direction and a second diameter in a second direction perpendicular to the first direction, the first diameter and the second diameter being different from each other, and
 wherein the alignment direction is an alignment direction of each of long axes of the liquid crystal molecules, and the alignment direction is variably changed between the first direction and the second direction.

2. The color filter of claim 1, wherein the plurality of nano structures comprise a dielectric comprising amorphous silicon.

3. The color filter of claim 1, wherein a ratio of the first diameter to the second diameter is 2:1 to 3.5:1.

4. The color filter of claim 3, wherein the liquid crystal molecules comprise nematic liquid crystal molecules.

5. The color filter of claim 1, wherein, as the alignment direction is changed from the first direction to the second direction, reflectance of light reflected and emitted from the plurality of nano structures decreases.

6. The color filter of claim 1, wherein, when the alignment direction is parallel to the first direction, the polarization control layer has a transmission axis parallel to the first direction, and reflectance of light reflected from the plurality of nano structures is maximized, and
 when the alignment direction is parallel to the second direction, the polarization control layer has a transmission axis parallel to the second direction, and the reflectance of the light reflected and emitted from the plurality of nano structures is minimized.

7. The color filter of claim 1, wherein the plurality of nano structures comprise:
   a plurality of first nano structures that emit light having a first wavelength;
   a plurality of second nano structures that emit light having a second wavelength, in which a wavelength is less than the first wavelength; and
   a plurality of third nano structures that emit light having a third wavelength, in which a wavelength is less than the second wavelength.

8. The color filter of claim 7, wherein, on the base substrate,
   the plurality of first nano structures are arranged to be spaced a first arrangement interval from each other, the plurality of second nano structures are arranged to be spaced a second arrangement interval from each other, and the plurality of third nano structures are arranged to be spaced a third arrangement interval from each other,
   the first arrangement interval is less than the first wavelength, the second arrangement interval is less than the second wavelength, and the third arrangement interval is less than the third wavelength, and
   the first arrangement interval to the third arrangement interval are arrangement intervals in a long axis direction of the plurality of first to third nano structures, respectively.

9. The color filter of claim 7, wherein a long axis diameter of each of the plurality of first nano structures in one direction is greater than that of each of the plurality of second nano structures in the one direction, and the long axis diameter of each of the plurality of second nano structures is greater than that of each of the third plurality of nano structures in the one direction.

10. The color filter of claim 7, wherein the alignment direction of at least one nano structure of the plurality of first nano structures to the plurality of third nano structures is different from that of the other nano structures.

11. The color filter of claim 1, wherein a long axis diameter of at least one nano structure among the plurality of nano structures is different from that of each of other nano structures.

12. The color filter of claim 1, wherein the polarization control layer comprises:
    a liquid crystal layer comprising the liquid crystal molecules;
    a first substrate disposed under the liquid crystal layer;
    a second substrate disposed over the liquid crystal layer; and
    a plurality of switching electrodes disposed above the first substrate and spaced apart from each other.

13. A color filter, which is divided into a first filter area, a second filter area, and a third filter area, which provide light having wavelength different from each other, the color filter comprising:
    a nano structure layer comprising a first filter part disposed to correspond to the first filter area and comprising a plurality of first nano structures, a second filter part disposed to correspond to the second filter area and comprising a plurality of second nano structures, and a third filter part disposed to correspond to the third filter area and comprising a plurality of third nano structures; and
    a polarization control layer, which is disposed on the nano structure layer and comprises a first substrate, a second substrate facing the first substrate, a plurality of switching electrodes disposed to be spaced apart from each other on a top surface of the first substrate, and a liquid crystal layer including liquid crystal molecules of which an alignment direction is controlled by an electric field between adjacent switching electrodes disposed between the first substrate and the second substrate, wherein
    each of the plurality of first to third nano structures has an elliptical shape on a plane,
    the plurality of first nano structures are arranged to be spaced a first arrangement interval from each other, the plurality of second nano structures are arranged to be spaced a second arrangement interval, which is less than the first arrangement interval, from each other, and the plurality of third nano structures are arranged to be spaced a third arrangement interval, which is less than the second arrangement interval, from each other,
    the first arrangement interval to the third arrangement interval are arrangement intervals in a long axis diameter direction of the plurality of first to third nano structures, respectively,
    each nano structure of the plurality of first nano structures, the plurality of second nano structures, and the plurality of third nano structures has a first diameter in a first direction and a second diameter in a second direction perpendicular to the first direction, the first diameter and the second diameter being different from each other, and
    the alignment direction is an alignment direction of each of long axes of the liquid crystal molecules, and the alignment direction is variably changed between the first direction and the second direction.

14. The color filter of claim 13, wherein the polarization control layer comprises:
    a first light control part corresponding to the first filter area;
    a second light control part corresponding to the second filter area; and
    a third light control part corresponding to the third filter area,
    wherein the alignment direction of the liquid crystal molecules is controlled independently in the first light control part to the third light control part.

15. The color filter of claim 14, wherein the liquid crystal molecules comprise nematic liquid crystal molecules.

16. The color filter of claim 13, wherein the plurality of first nano structures emit light having a first wavelength,
    the plurality of second nano structures emit light having a second wavelength, in which a wavelength is less than the first wavelength, and
    the plurality of third nano structures emit light having a third wavelength, in which a wavelength is less than the third wavelength.

17. The color filter of claim 16, wherein the first arrangement interval is less than the first wavelength,
    the second arrangement interval is less than the second wavelength, and
    the third arrangement interval is less than the third wavelength.

18. The color filter of claim 16, wherein a first long axis diameter of each of the plurality of first nano structures, a second long axis diameter of each of the plurality of second nano structures, and a third long axis diameter of each of the plurality of third nano structures are different from each other.

19. The color filter of claim 13, wherein the plurality of first nano structures are aligned in a first arrangement direction, the plurality of second nano structures are aligned in a second arrangement direction, and the plurality of third nano structures are aligned in a third arrangement direction,
at least one of the first arrangement direction, the second arrangement direction, or the third arrangement direction is different from the others; and
the first to third arrangement directions are directions of the long axis diameters of the plurality of first to third nano structures, respectively.

20. The color filter of claim 19, wherein the alignment direction of the liquid crystal molecules in each of a first light control part, a second light control part, and a third light control part is independently controlled between a first direction parallel to each of the first arrangement direction, the second arrangement direction, and the third arrangement direction and a second direction perpendicular to the first direction.

* * * * *